(12) United States Patent
Dabak et al.

(10) Patent No.: US 8,718,115 B2
(45) Date of Patent: May 6, 2014

(54) BUILDING, TRANSMITTING, AND RECEIVING FRAME STRUCTURES IN POWER LINE COMMUNICATIONS

(75) Inventors: Anand G. Dabak, Plano, TX (US); Badri N. Varadarajan, Mountain View, CA (US); Il Han Kim, Dallas, TX (US); Tarkesh Pande, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 238 days.

(21) Appl. No.: 13/269,487

(22) Filed: Oct. 10, 2011

(65) Prior Publication Data

US 2012/0093198 A1 Apr. 19, 2012

Related U.S. Application Data

(60) Provisional application No. 61/391,382, filed on Oct. 8, 2010, provisional application No. 61/417,657, filed on Nov. 29, 2010, provisional application No. 61/418,584, filed on Dec. 1, 2010, provisional application No. 61/431,249, filed on Jan. 10, 2011, provisional application No. 61/431,899, filed on Jan. 12, 2011, provisional application No. 61/434,572, filed on Jan. 20, 2011.

(51) Int. Cl.
*H04B 1/00* (2006.01)
*H04J 11/00* (2006.01)

(52) U.S. Cl.
USPC .......................... 375/133; 375/142; 370/206

(58) Field of Classification Search
USPC .................................. 375/133, 142; 370/206
See application file for complete search history.

(56) References Cited

U.S. PATENT DOCUMENTS

| | | | | |
|---|---|---|---|---|
| 4,968,970 A * | 11/1990 | LaPorte | | 375/133 |
| 5,132,986 A * | 7/1992 | Endo et al. | | 375/142 |
| 5,802,467 A * | 9/1998 | Salazar et al. | | 455/420 |
| 6,559,757 B1 * | 5/2003 | Deller et al. | | 370/206 |
| 7,321,629 B2 * | 1/2008 | Feng et al. | | 375/260 |
| 2004/0146115 A1 * | 7/2004 | Feng et al. | | 375/260 |
| 2007/0286063 A1 * | 12/2007 | Aulin | | 370/203 |
| 2008/0192661 A1 * | 8/2008 | Hamamoto et al. | | 370/310 |
| 2009/0285310 A1 * | 11/2009 | Iwami et al. | | 375/240.25 |
| 2009/0304130 A1 * | 12/2009 | Umari et al. | | 375/345 |
| 2011/0249548 A1 * | 10/2011 | Gaal et al. | | 370/206 |

* cited by examiner

*Primary Examiner* — Leon-Viet Nguyen
*Assistant Examiner* — Sarah Hassan
(74) *Attorney, Agent, or Firm* — Steven A. Shaw; Wade James Brady, III; Frederick J. Telecky, Jr.

(57) ABSTRACT

Systems and methods for building, transmitting, and receiving frame structures in power line communications (PLC) are described. Various techniques described herein provide a preamble design using one or more symbols based on a chirp signal that yields a low peak-to-average power ratio (PAPR). According to some techniques, the preamble may be constructed with one or more different types and/or number of symbols configured to identify a PLC domain operating in close physical proximity to another PLC domain. According to other techniques, one or more preamble symbols may be interspersed within a header portion of a PLC frame to facilitate estimation of a frame boundary and/or sampling frequency offset, for example, in the presence of impulsive noise. According to yet other techniques, a PLC detector may be capable of receiving and decoding two or more types of PLC frames (e.g., using different PLC standards).

11 Claims, 14 Drawing Sheets

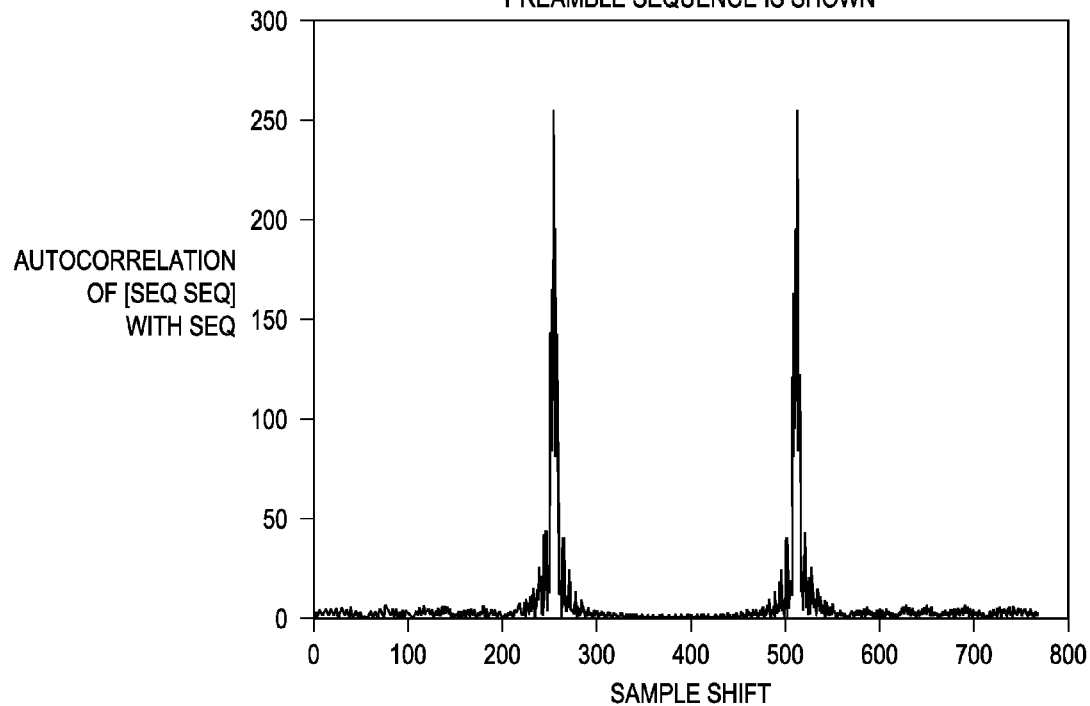
FIG. 11   AUTOCORRELATION OF THE PROPOSED PREAMBLE SEQUENCE IS SHOWN
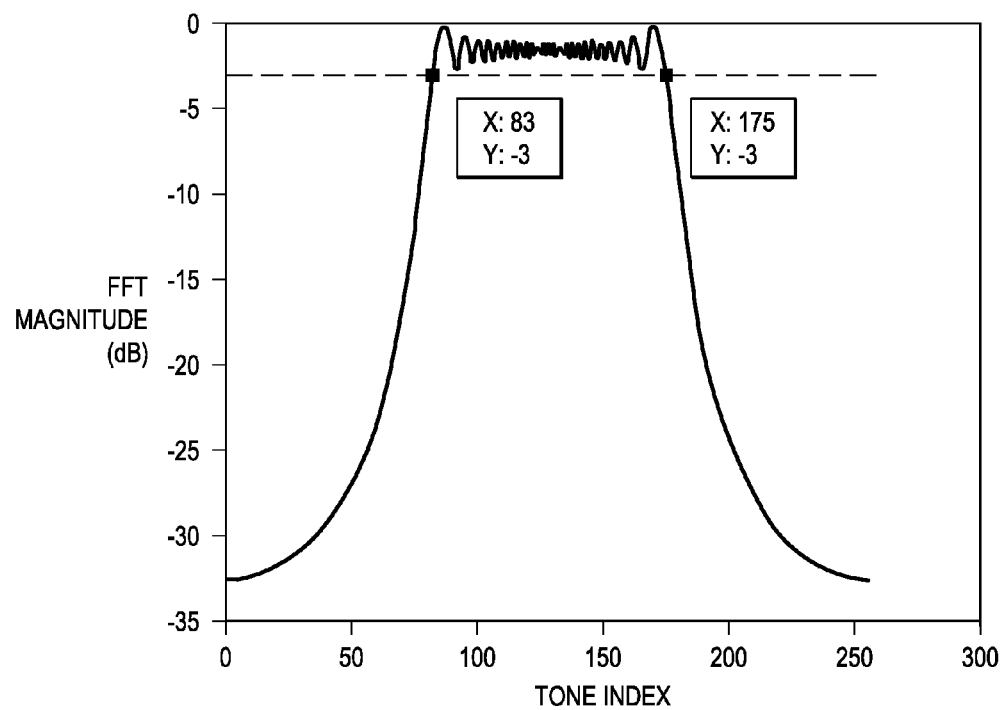
FIG. 12

CDF OF CROSS-CORRELATION FOR THE 8
CHOSEN ZC SEQUENCES + CHIRP SEQUENCES

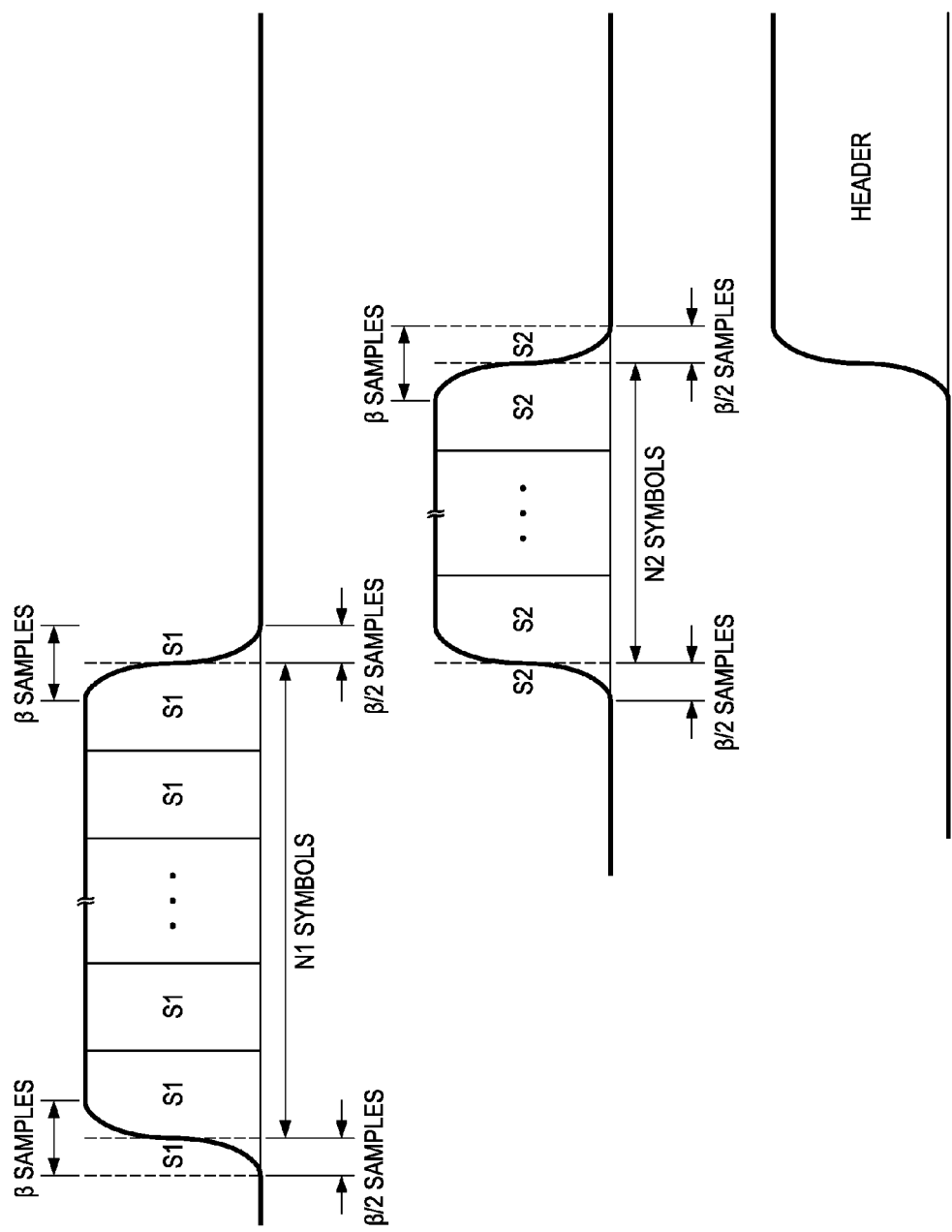

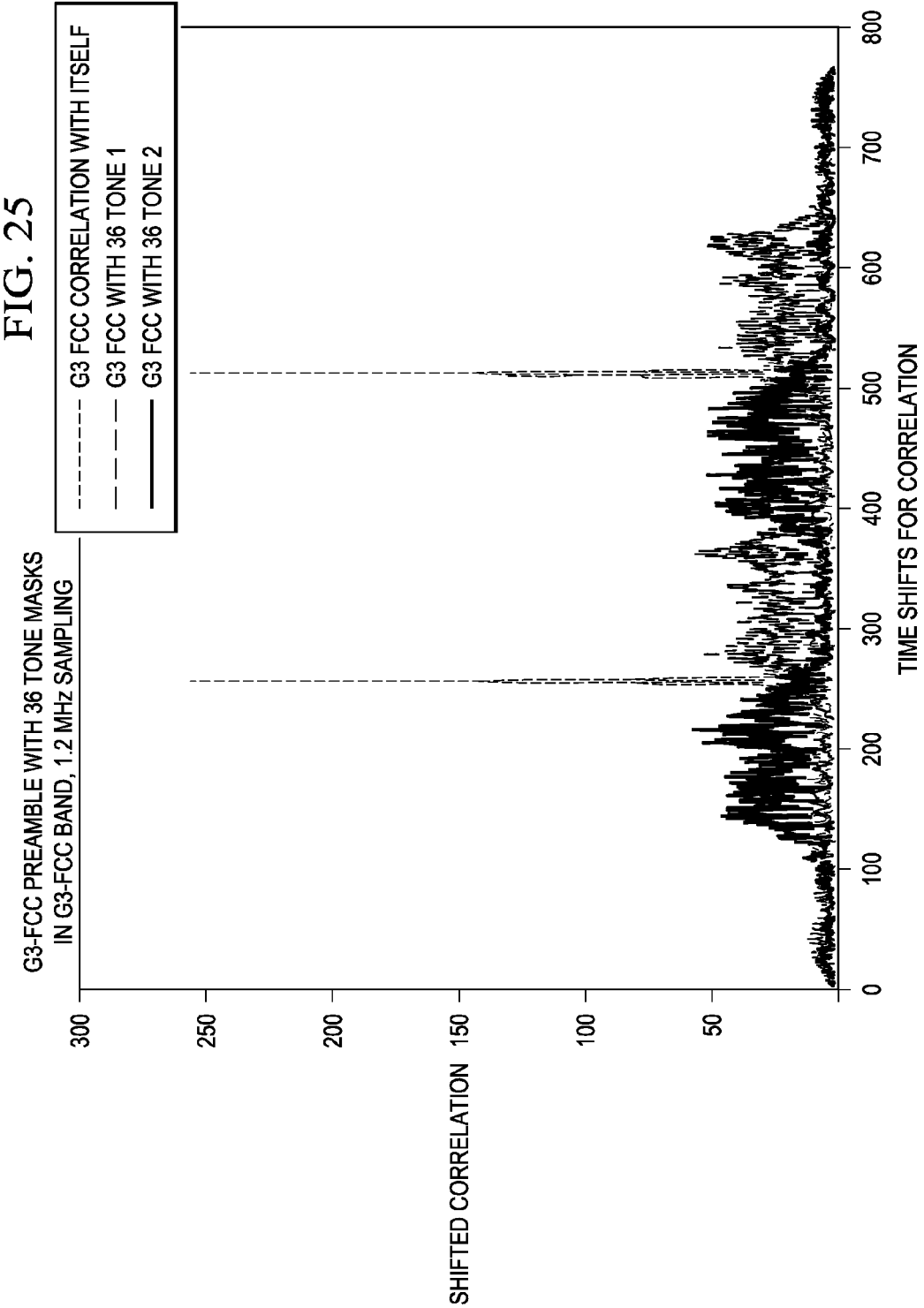

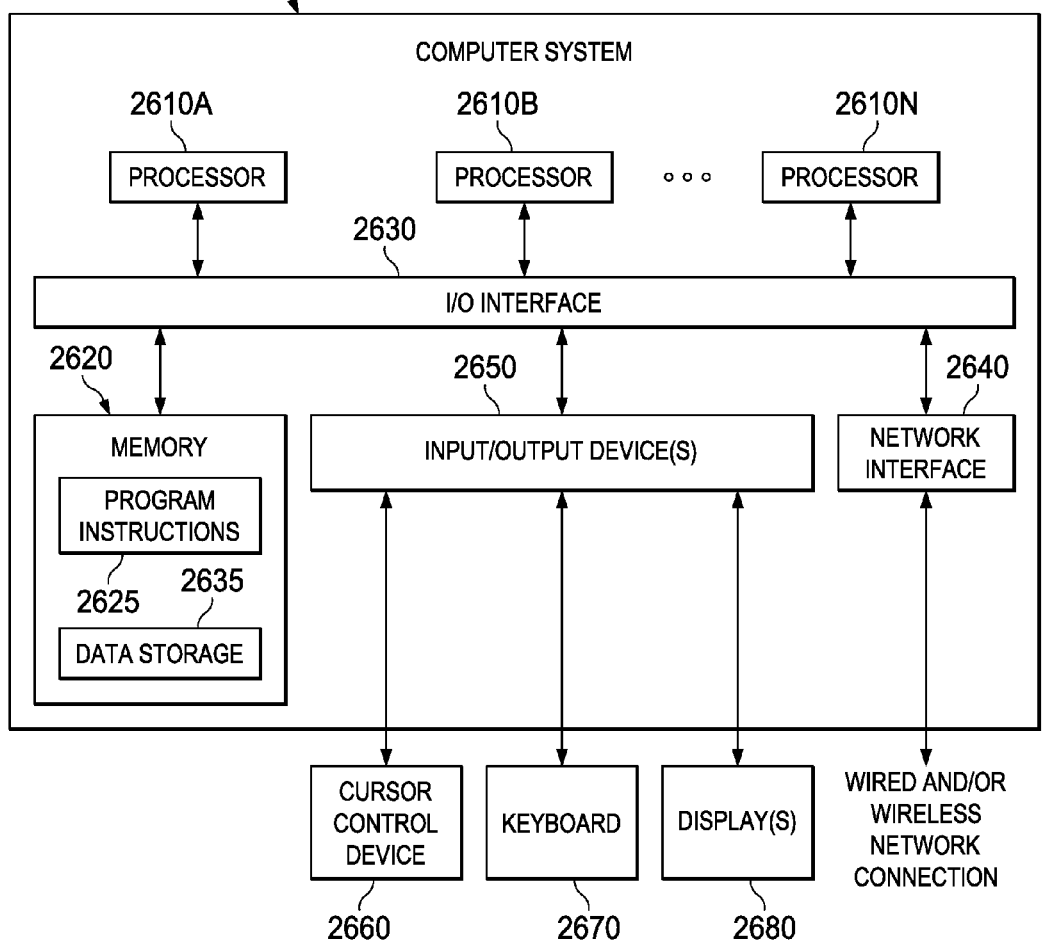

BUILDING, TRANSMITTING, AND RECEIVING FRAME STRUCTURES IN POWER LINE COMMUNICATIONS

CROSS-REFERENCE TO RELATED APPLICATIONS

This application claims the benefit of the filing date of U.S. Provisional Patent Application No. 61/391,382 titled "Preamble Structure in G.HNEM" filed Oct. 8, 2010, U.S. Provisional Patent Application No. 61/417,657 titled "Preamble Structure in G.HNEM" filed Nov. 29, 2010, U.S. Provisional Patent Application No. 61/418,584 titled "Preamble Structure in G.HNEM" filed Dec. 1, 2010, U.S. Provisional Patent Application No. 61/431,249 titled "Preamble Structure in G.HNEM" filed Jan. 10, 2011, U.S. Provisional Patent Application No. 61/431,899 titled "Preamble Structure in G.HNEM" filed Jan. 12, 2011, and U.S. Provisional Patent Application No. 61/434,572 titled "G.hnem: Proposal for Repeated SYNCH Sequences for Frame Boundary Detection" filed Jan. 20, 2011, the disclosures of which are hereby incorporated by reference herein in their entirety.

TECHNICAL FIELD

Embodiments are directed, in general, to power line communications, and, more specifically, to systems and methods of building, transmitting, and receiving frame structures in power line communications.

BACKGROUND

Power line communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

Various PLC standardizing efforts are currently being undertaken around the world, each with its own unique characteristics. Generally speaking, PLC systems may be implemented differently depending upon local regulations, characteristics of local power grids, etc. Examples of competing PLC standards include the IEEE 1901, HomePlug AV, and ITU-T G.hn (e.g., G.9960 and G.9961) specifications. Another standardization effort includes, for example, the Powerline-Related Intelligent Metering Evolution (PRIME) standard designed for OFDM-based (Orthogonal Frequency-Division Multiplexing) communications. The current or existing PRIME standard referred to herein is the Draft Standard prepared by the PRIME Alliance Technical Working Group (PRIME R1.3E) and earlier versions thereof.

SUMMARY

Systems and methods for building, transmitting, and receiving frame structures in power line communications (PLC) are described. Various techniques described herein provide a preamble design using one or more symbols based on a chirp signal that yields a low peak-to-average power ratio (PAPR). According to some techniques, the preamble may be constructed with one or more different types and/or number of symbols configured to identify a PLC domain operating in close physical proximity to another PLC domain. According to other techniques, one or more preamble symbols may be interspersed within a header portion of a PLC frame to facilitate estimation of a frame boundary and/or sampling frequency offset, for example, in the presence of impulsive noise. According to yet other techniques, a PLC detector may be capable of receiving and decoding two or more types of PLC frames (e.g., using different PLC standards).

In an embodiment, a method may include generating a chirp sequence having a bandwidth selected, at least in part, by subtracting an excess bandwidth parameter from a low nominal frequency and adding the excess bandwidth parameter to a high nominal frequency. For example, the high and low nominal frequencies may be based, at least in part, upon a PLC standard, and the excess bandwidth parameter may be a function of a difference between the high and low nominal frequencies. The method may also include extracting a phase angle of a frequency-domain version of the chirp sequence to obtain a flattened frequency spectrum, creating a phase quantized sequence based, at least in part, upon the flattened frequency spectrum, and employing the phased quantized sequence as a symbol to generate a PLC preamble portion of a PLC frame. In some cases, creating the phase quantized sequence may include using a quantization factor smaller than another quantization factor selected based, at least in part, upon the PLC standard.

In some implementations, to employ the phased quantized sequence as the symbol to generate the PLC preamble portion, the method may further include repeating the symbol N1 times to create a first section of the PLC preamble portion, where $N_1$ is an integer, repeating a phase inverted version of the symbol $N_2$ times to create a second section of the PLC preamble portion, where $N_2$ is an integer that may be different from $N_1$, extending the first and second sections of the PLC preamble portion, and combining the first and second extended sections of the PLC preamble portion.

Moreover, to extend the first and second sections of the PLC preamble portion, the method may further include prepending the last $\beta$ samples of the symbol to a first symbol of the first section of the PLC preamble portion, appending the first $\beta$ samples of the symbol to a last symbol of the first section of the PLC preamble portion to create the first extended section of the PLC preamble portion, where $\beta$ is less than a number of samples in the symbol (e.g., half), and windowing the first and last $\beta$ samples of the first extended section of the PLC preamble portion. The method may also include prepending the last $\beta$ samples of the symbol to a first symbol of the second section of the PLC preamble portion, appending the first $\beta$ samples of the symbol to a last symbol of the second section of the PLC preamble portion to create second extended section of the PLC preamble portion, and windowing the first and last $\beta$ samples of the second extended section of the PLC preamble portion.

To employ the phased quantized sequence as the symbol to generate the PLC preamble portion, the method may include repeating the symbol $N_1$ times to create a first section of the PLC preamble portion, where $N_1$ is an integer, generating another sequence independent from than the phased quantized sequence of the symbol, repeating the another sequence $N_2$ times to create a second section of the PLC preamble portion, where $N_2$ is an integer, and combining the first and second sections of the PLC preamble portion. For example, the another sequence may include a Zadoff-Chu sequence.

In some cases, the another sequence (e.g., a Zadoff-Chu sequence or the like) may identify a given PLC domain. Accordingly, the preambles used in all signals transmitted within a given PLC domain may each include the same sequence in their second portions (preambles used in a different PLC domain may have a different sequence in their second portions). In this manner, by examining the sequence in the second portion of a preamble, it is possible to determine to which PLC domain the signal or frame belongs. In other cases, $N_1$ may identify the given PLC domain. That is, the number of repetitions of the symbol used in the first portion of a PLC preamble may help determine the preamble's originating domain. In yet other cases, a combination of $N_1$ and the another sequence may identify the PLC domain.

In another embodiment, another method may include identifying a first symbol within a PLC preamble. The method may also include inserting an instance of the first symbol at a predetermined location within a PLC header portion of a PLC frame and cause the PLC frame to be transmitted over a power line. In addition, the method may further include inserting another instance of the first symbol at another predetermined location within the PLC header portion of the PLC frame.

In some cases, the method may include identifying a second symbol within the PLC preamble portion of the PLC frame, the second symbol different from the first symbol, and inserting an instance of the second symbol at another predetermined location within the PLC header portion of the PLC frame. Upon receipt of another PLC frame, the method may include locating a position of a preamble symbol within a header portion of the another PLC frame and estimating at least one of: a start of the another PLC frame or a sampling frequency offset based, at least in part, upon the position.

In yet another embodiment, yet another method may include receiving a PLC frame. In response to a determination that the PLC device is operating in a multi-header decode mode where each different header portion is a accompanied by a same preamble portion, the method may include attempting to decode a header portion of the PLC frame using a first decoding based, at least in part, upon the preamble portion. In response to the attempt being successful, the method may include decoding the PLC frame using the first decoding. Otherwise, the method may include attempting to decode the header portion of the PLC frame using a second decoding based, at least in part, upon the preamble portion, each of the first and second decoding based upon a different PLC standard.

Additionally or alternatively, in response to a determination that the PLC device is operating in another multi-header decode mode where each different header portion is a accompanied by a different preamble portion, the method may include simultaneously attempting to decode the header portion of the PLC frame using the first and second decodings based, at least in part, upon the different preamble portions. Upon locating a position of a preamble symbol within the header portion of the PLC frame, the method may include estimating a start of the PLC frame and/or estimating a sampling frequency offset based, at least in part, upon the position.

In still other embodiments, a method may include attempting to decode a preamble portion of a PLC frame using a first decoding technique, the preamble portion following one of a plurality of different PLC standards. The method may also include, in response to the attempt being successful, decoding the PLC frame using the first decoding technique. The method may further include, in response to the attempt being unsuccessful, attempting to decode the preamble portion of the PLC frame using a second decoding technique, the first and second decoding techniques each based upon a different PLC standard.

In some implementations, one or more of the techniques described herein may be performed by one or more computer systems. In other implementations, a tangible computer-readable storage medium may have program instructions stored thereon that, upon execution by one or more computer systems, cause the one or more computer systems to execute one or more operations disclosed herein. In yet other implementations, a system (e.g., a PLC modem) may include at least one processor and a memory coupled to the at least one processor. Examples of a processor include, but are not limited to, a digital signal processor (DSP), an application specific integrated circuit (ASIC), a system-on-chip (SoC) circuit, a field-programmable gate array (FPGA), a microprocessor, or a microcontroller. The memory may be configured to store program instructions executable by the at least one processor to cause the system to execute one or more operations disclosed herein.

BRIEF DESCRIPTION OF THE DRAWINGS

Figure 1:
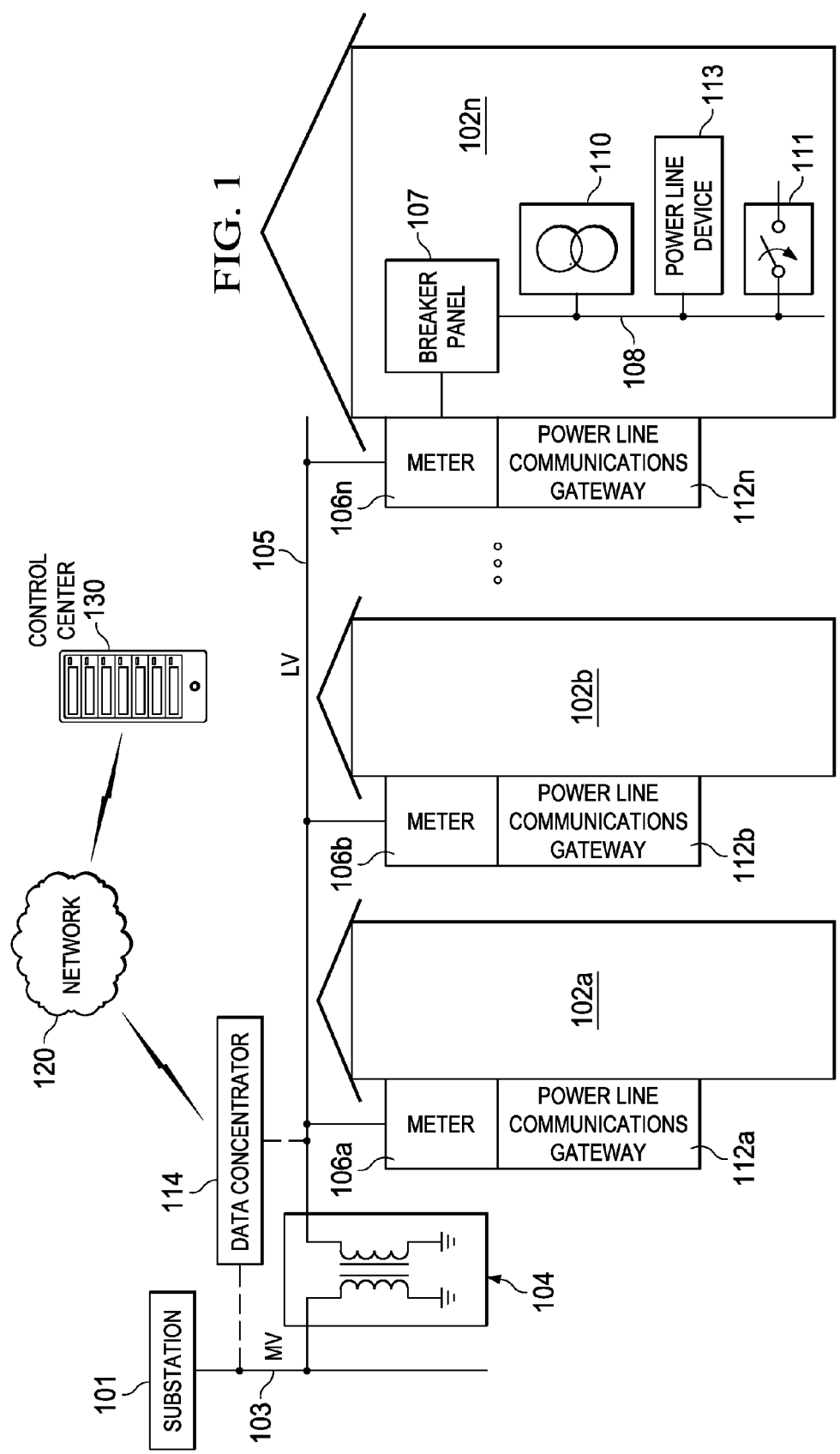

Having thus described the invention(s) in general terms, reference will now be made to the accompanying drawings, wherein:

FIG. 1 is a diagram of a PLC environment according to some embodiments.

Figure 2:
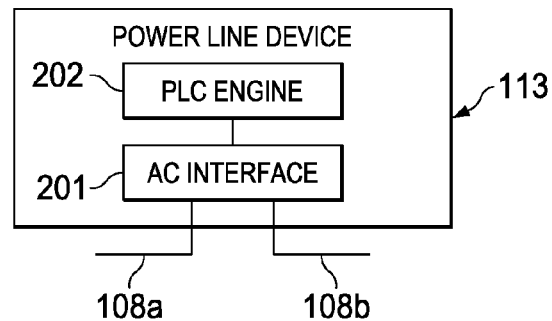

FIG. 2 is a block diagram of a PLC device or modem according to some embodiments.

Figure 3:
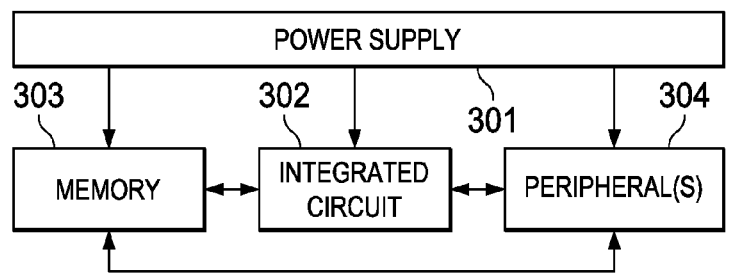

FIG. 3 is a block diagram of an integrated circuit according to some embodiments.

Figure 4:
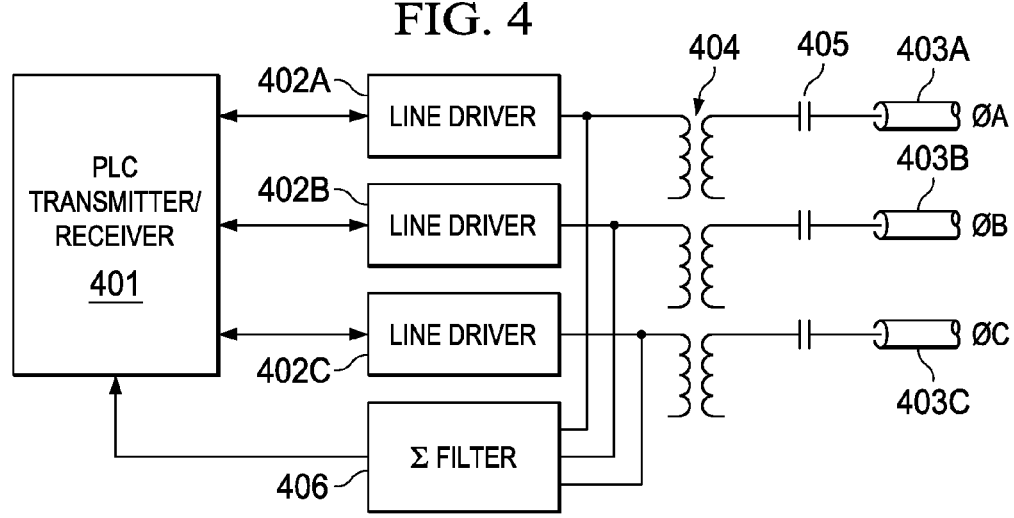
Figure 5:
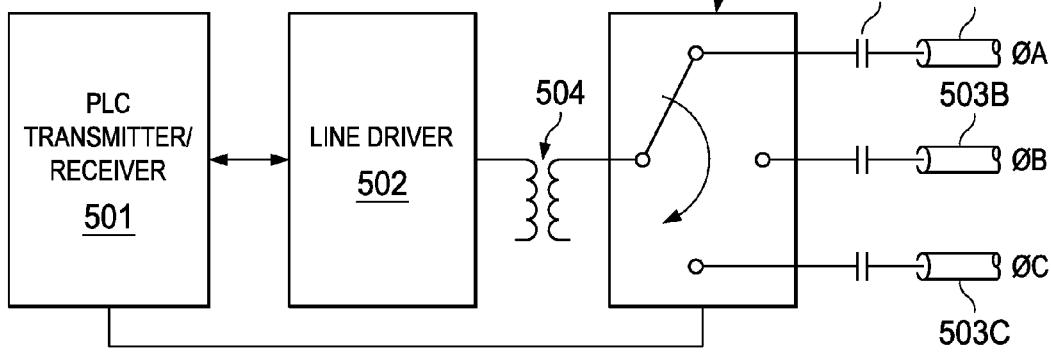
Figure 6:
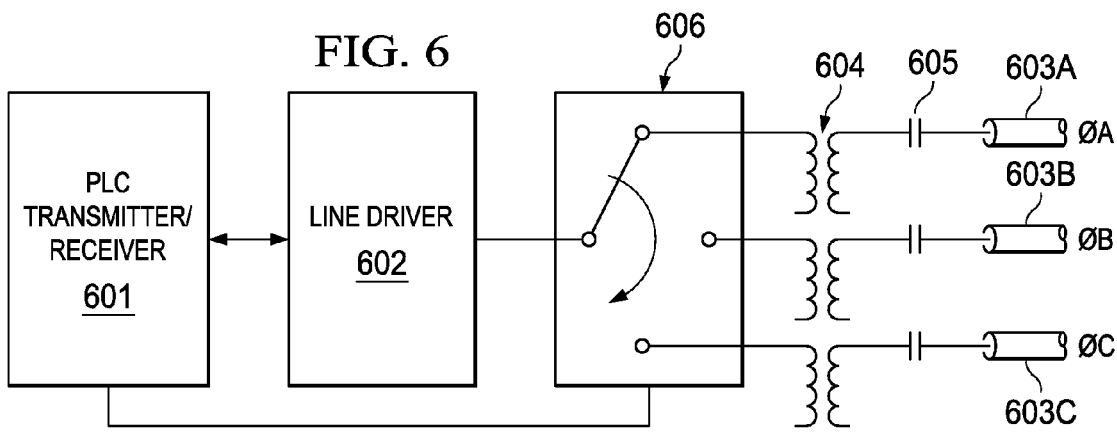

FIGS. 4-6 are block diagrams illustrating alternative connections between a power line communications transmitter and/or receiver circuitry to three-phase power lines according to some embodiments.

Figure 7:
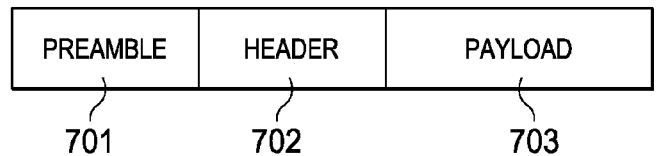

FIG. 7 is a diagram of a PLC data frame according to some embodiments.

Figure 8:
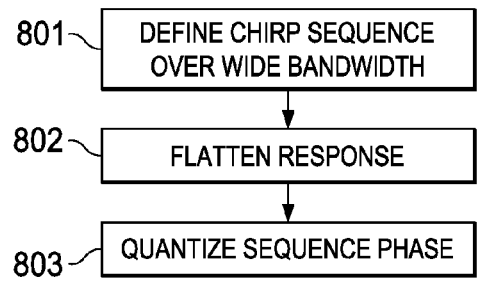

FIG. 8 is a flowchart of a method of creating a PLC preamble symbol or sequence according to some embodiments.

Figure 9:
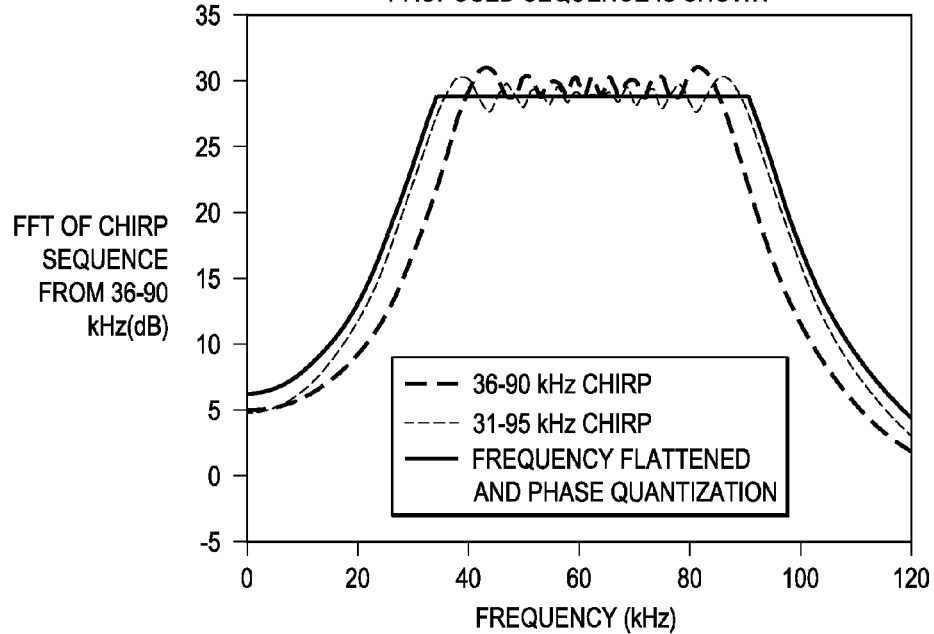

FIG. 9 is a graph of a fast Fourier transform (FFT) of a 36-90 kHz chirp signal with a 31-95 kHz signal also shown according to some embodiments.

Figure 10:
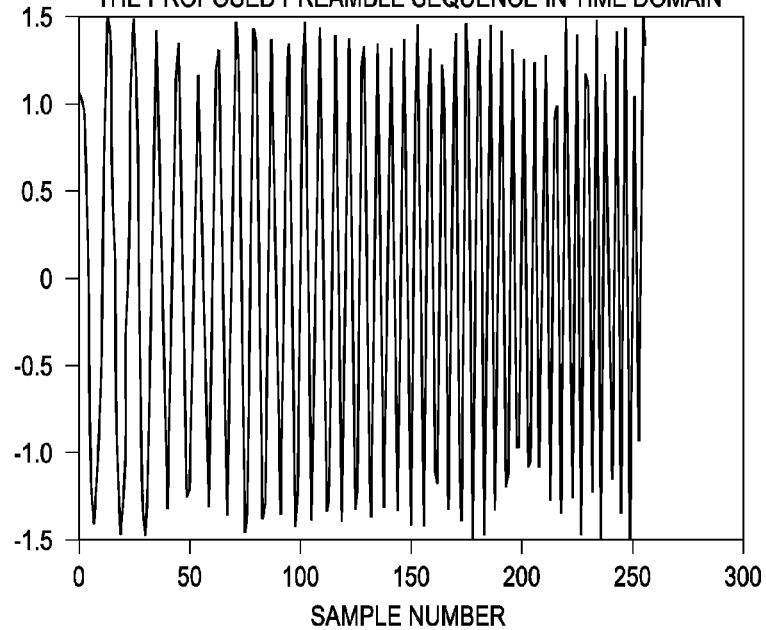

FIG. 10 is a graph of a preamble symbol shown in the time domain with a PAPR of 4 dB according to some embodiments.

FIG. 11 is a graph illustrating the autocorrelation of a preamble symbol with respect to two repetitions of the same sequence according to some embodiments.

FIG. 12 is a graph of the FFT output magnitude of a chirp signal defined with nominal start and end tones of 79 and 178, respectively, according to some embodiments.

Figure 13:
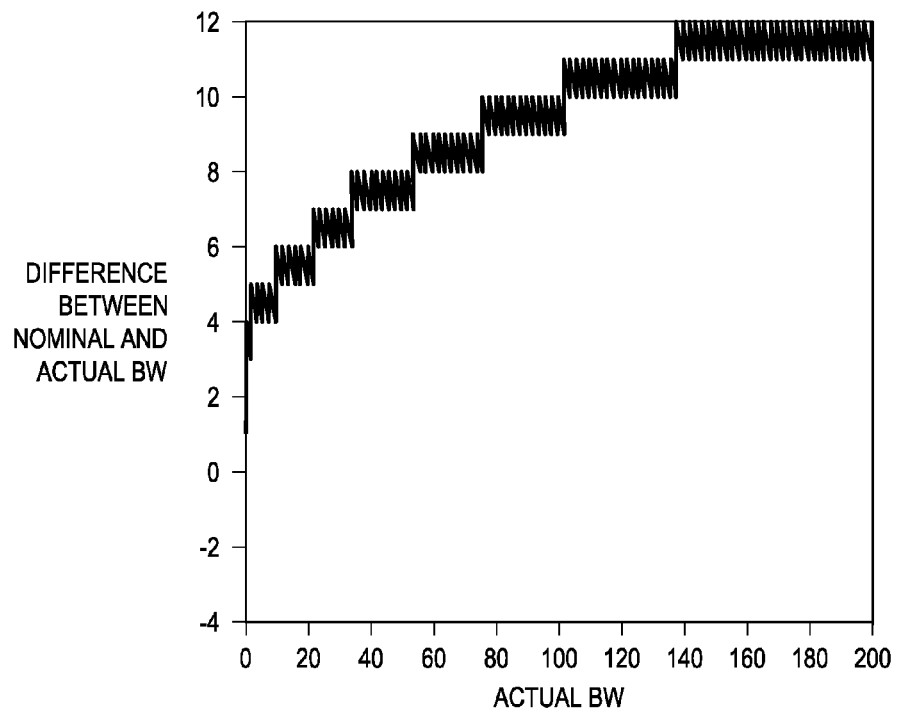

FIG. 13 is a graph of a difference between nominal and actual bandwidth for Nfft=256 according to some embodiments.

FIG. 14 is a diagram of a preamble time-domain generation according to some embodiments.

Figure 15:
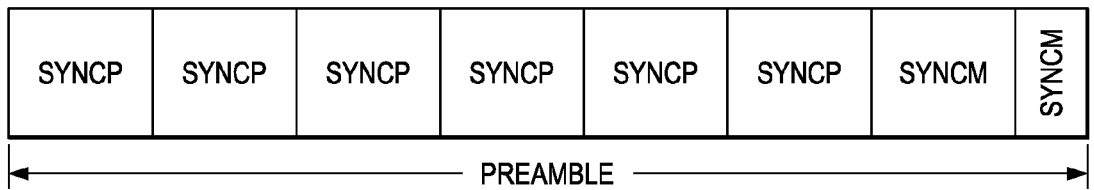

FIG. 15 is a diagram illustrating a PLC preamble portion of a PLC frame according to some embodiments.

Figure 16:
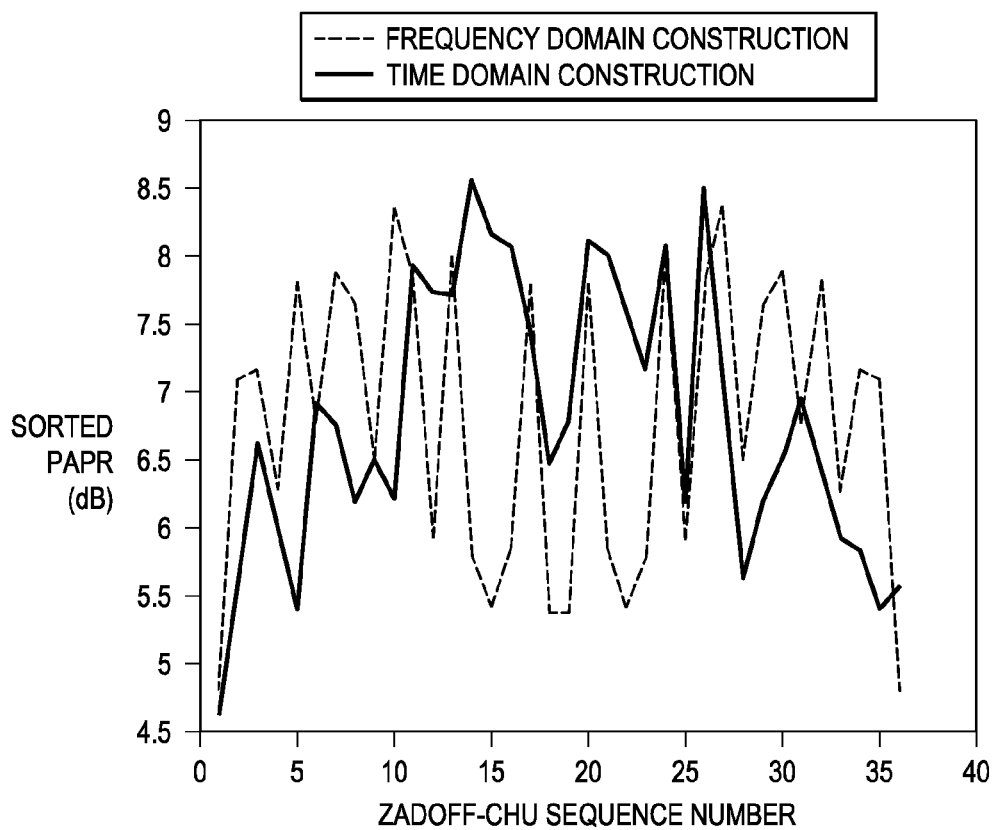

FIG. 16 is a graph of sorted PAPR for time-domain and frequency-domain generated Zadoff-Chu sequences according to some embodiments.

Figure 17:
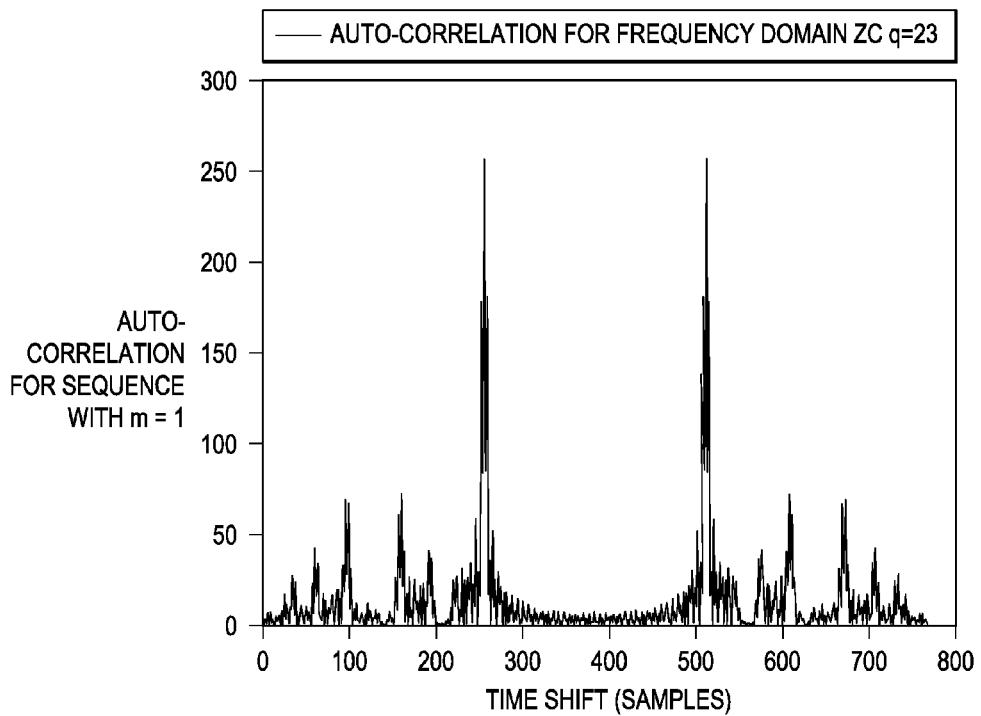

FIG. 17 is a graph illustrating the autocorrelation of the frequency-domain based preamble sequences for q=23 using Zadoff-Chu constructions according to some embodiments.

Figure 18:
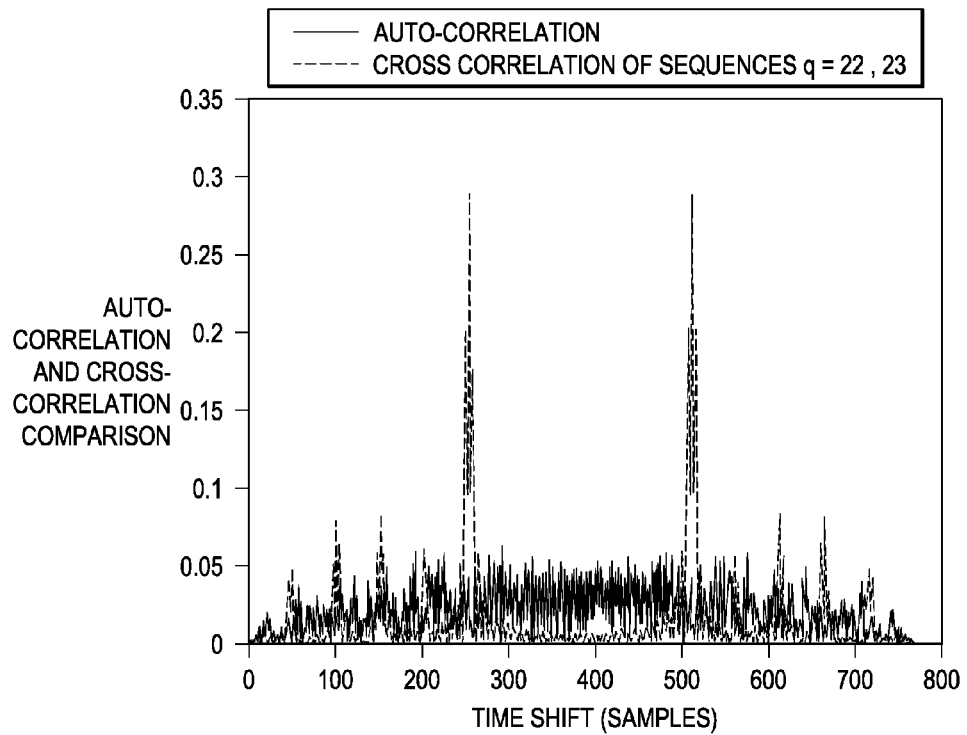

FIG. 18 is a graph illustrating a comparison between auto-correlation and cross-correlation for Zadoff-Chu sequences with q=36, 37 generated using a time-domain technique according to some embodiments.

Figure 19:
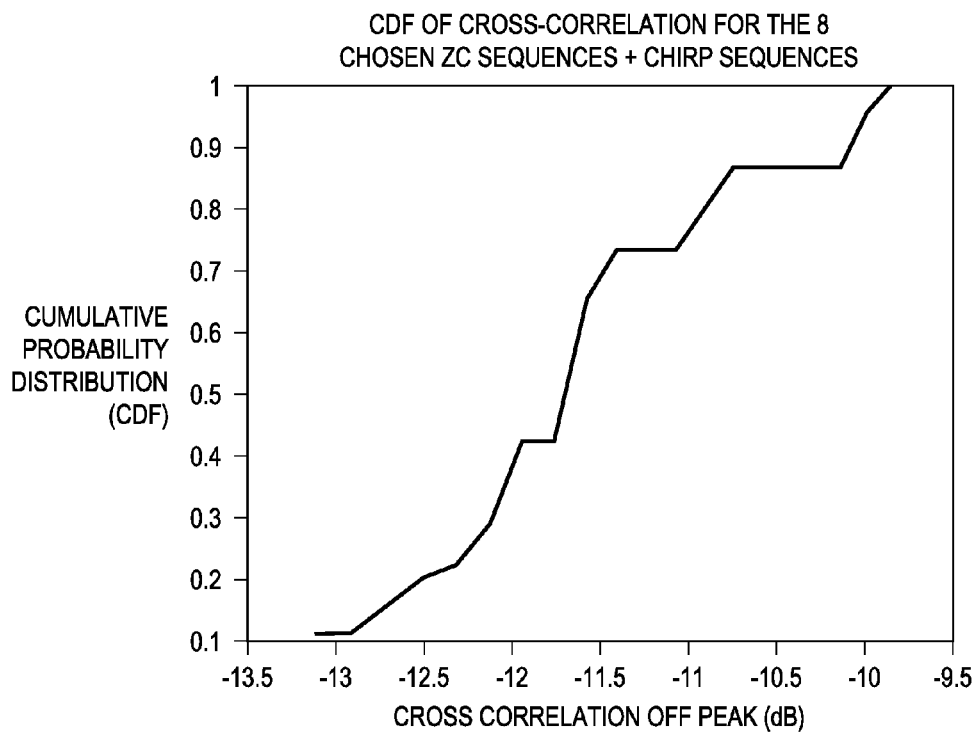

FIG. 19 illustrates the cumulative probability distribution of the cross-correlation of a chosen Zadoff-Chu sequence in addition to two other sequences according to some embodiments.

Figure 20:
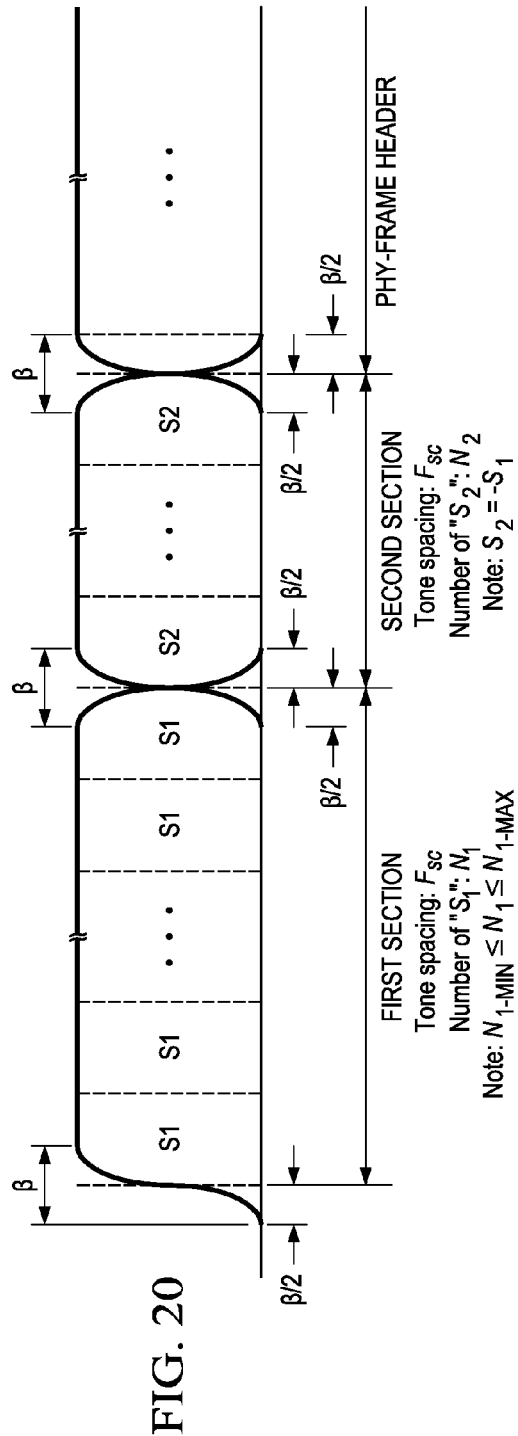

FIG. 20 is a diagram illustrating a portion of a PLC frame according to some embodiments.

Figure 21A:
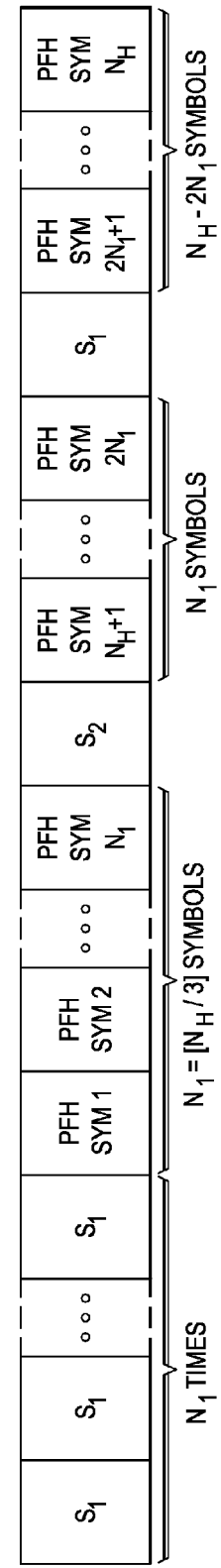
Figure 21B:
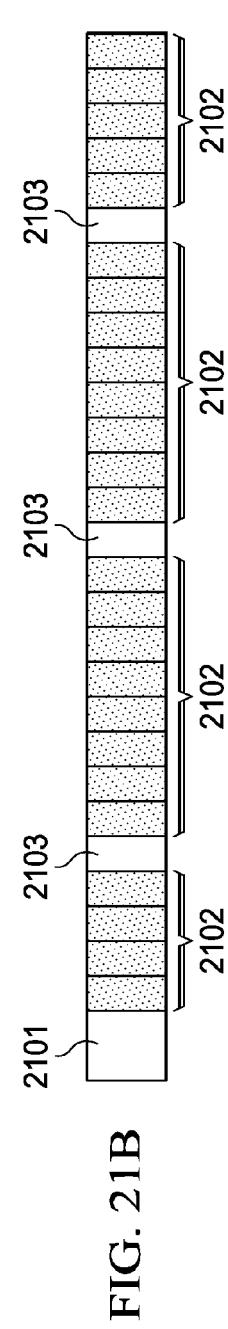

FIGS. 21A-B are diagrams illustrating structures of pilot symbols within a PLC header according to some embodiments.

Figure 22:
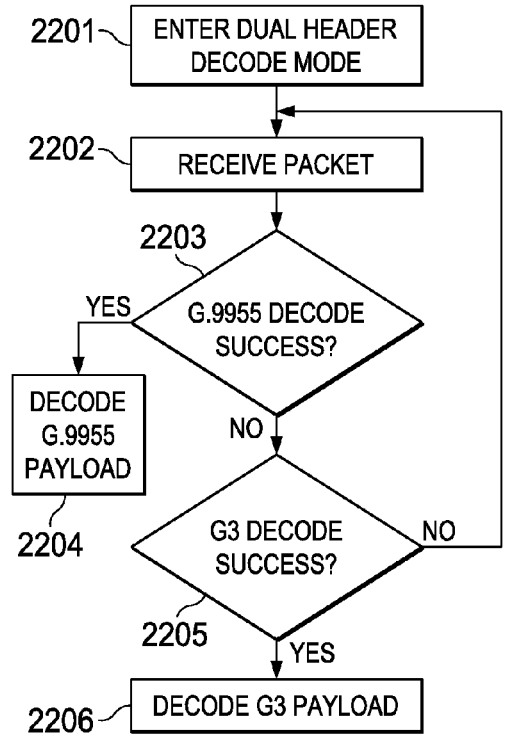
Figure 23:
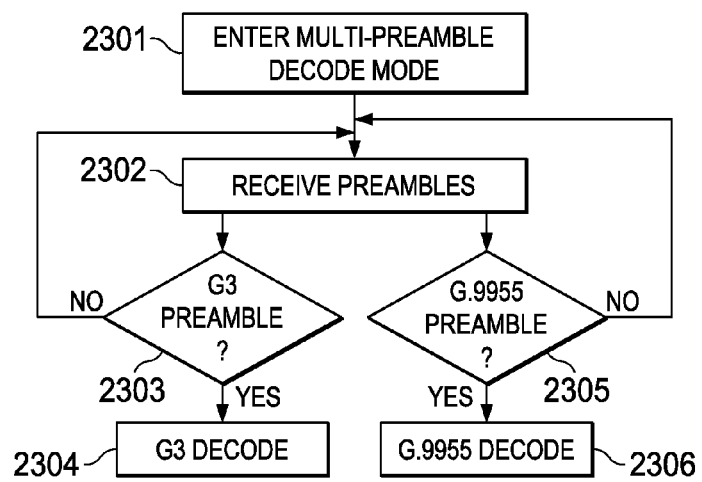

FIGS. 22 and 23 are flowcharts of methods of multi-mode detection according to some embodiments.

Figure 24:
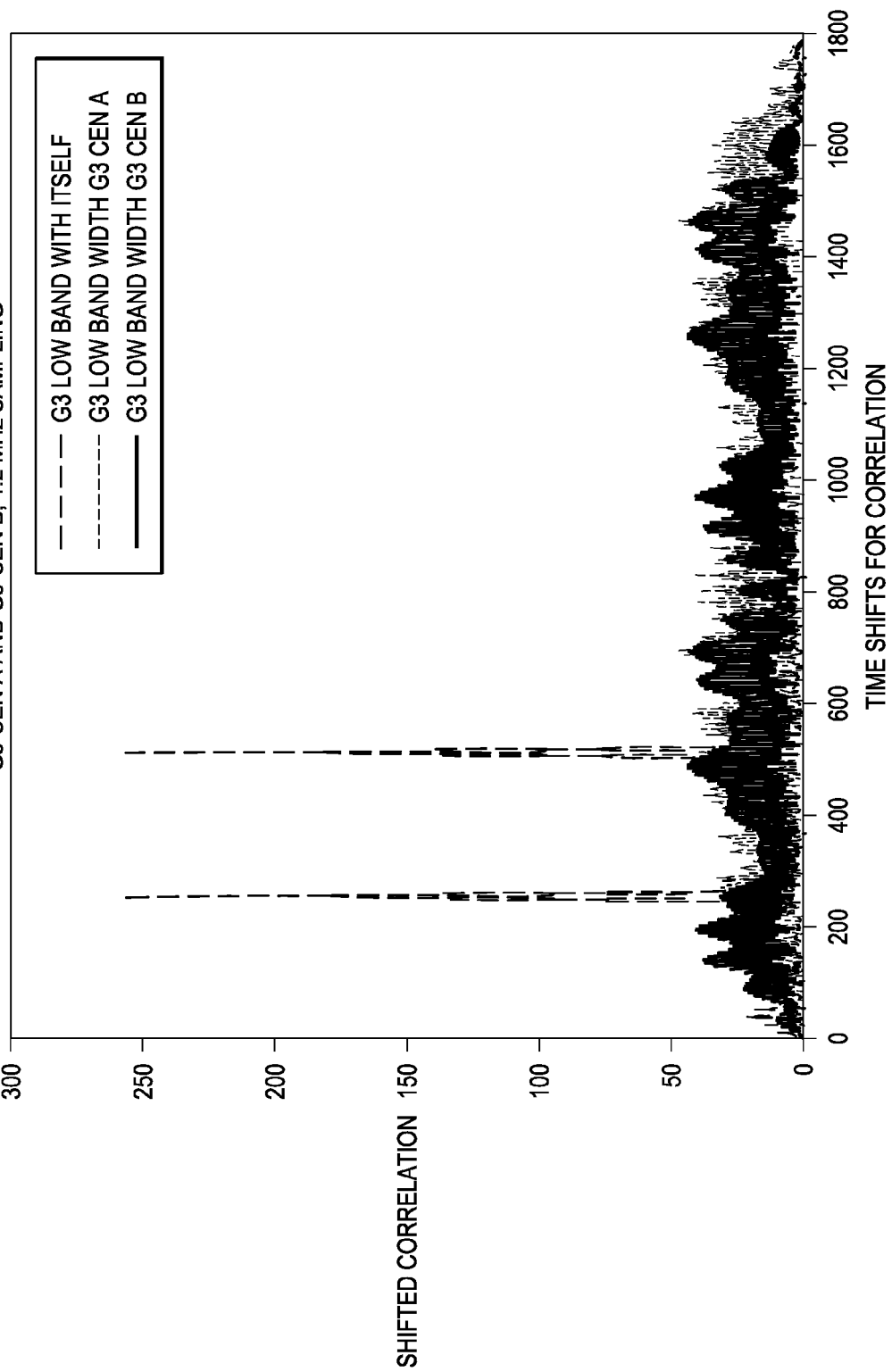

FIG. 24 is a diagram illustrating correlations of the preambles in G3-low band, G3 CEN A and G3 CEN B bands according to some embodiments.

FIG. 25 is a diagram illustrating correlations of preambles in G3 FCC band, G3 FCC 36 tone masks according to some embodiments.

FIG. 26 is a block diagram of a computing system configured to implement systems and methods described herein according to some embodiments.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

Turning to FIG. 1, an electric power distribution system is depicted according to some embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. (Although referred to as "residences," premises 102a-n may include any type of building, facility or location where electric power is received and/or consumed.) A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use, for example, a carrier signal having a frequency different from that of the power signal. The carrier signal may be modulated by the data, for example, using an orthogonal frequency division multiplexing (OFDM) scheme or the like.

PLC modems or gateways 112a-n at residences 102a-n use the MV/LV power grid to carry data signals to and from PLC data concentrator 114 without requiring additional wiring. Concentrator 114 may be coupled to either MV line 103 or LV line 105. Modems or gateways 112a-n may support applications such as high-speed broadband Internet links, narrow-band control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more data concentrators 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

In some embodiments, each concentrator 114 may be seen as a based node for a PLC domain, each such domain comprising downstream PLC devices that communicate with control center 130 through a respective concentrator 114. For example, in FIG. 1, device 106a-n, 112a-n, and 113 may all be considered part of the PLC domain that has data concentrator 114 as its base node; although in other scenarios other devices may be used as the base node of a PLC domain. In a typical situation, multiple nodes may be deployed in a given PLC network, and at least a subset of those nodes may be tied to a common clock through a backbone (e.g., Ethernet, digital subscriber loop (DSL), etc.).

Still referring to FIG. 1, meter 106, gateways 112, PLC device 113, and data concentrator 114 may each be coupled to or otherwise include a PLC modem or the like. The PLC modem may include transmitter and/or receiver circuitry to facilitate the device's connection to power lines 103, 105, and/or 108.

FIG. 2 is a block diagram of PLC device or modem 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. As noted above, in some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data aggregators 114, etc.) for further processing. Conversely, PLC engine 202 may receive instructions and/or other information from such higher-level PLC devices encoded in PLC signals, for example, to allow PLC engine 202 to select a particular frequency band in which to operate.

In various embodiments, PLC device 113 may be implemented at least in part as an integrated circuit. FIG. 3 is a block diagram of such an integrated circuit. In some cases, one or more of meter 106, gateway 112, PLC device 113, or data concentrator 114 may be implemented similarly as shown in FIG. 3. For example, integrated circuit 302 may be a digital signal processor (DSP), an application specific integrated circuit (ASIC), a system-on-chip (SoC) circuit, a field-programmable gate array (FPGA), a microprocessor, a microcontroller, or the like. As such, integrated circuit 302 may implement, at least in part, at least a portion of PLC engine 202 shown in FIG. 2. Integrated circuit 302 is coupled to one or more peripherals 304 and external memory 303. Further, integrated circuit 302 may include a driver for communicating signals to external memory 303 and another driver for communicating signals to peripherals 304. Power supply 301 is also provided which supplies the supply voltages to integrated circuit 302 as well as one or more supply voltages to memory 303 and/or peripherals 304. In some embodiments, more than one instance of integrated circuit 302 may be included (and more than one external memory 303 may be included as well).

Peripherals 304 may include any desired circuitry, depending on the type of PLC device or system. For example, in some embodiments, peripherals 304 may implement, at least in part, at least a portion of a PLC modem (e.g., portions of AC interface 210 shown in FIG. 2). Peripherals 304 may also include additional storage, including RAM storage, solid-state storage, or disk storage. In some cases, peripherals 304 may include user interface devices such as a display screen, including touch display screens or multi-touch display screens, keyboard or other input devices, microphones, speakers, etc.

External memory 303 may include any type of memory. For example, external memory 303 may include SRAM, non-volatile RAM (NVRAM, such as "flash" memory), and/or dynamic RAM (DRAM) such as synchronous DRAM (SDRAM), double data rate (DDR, DDR2, DDR3, etc.) SDRAM, Rambus® DRAM, etc. External memory 303 may include one or more memory modules to which the memory devices are mounted, such as single inline memory modules (SIMMs), dual inline memory modules (DIMMs), etc.

In various implementations, PLC device or modem 113 may include transmitter and/or receiver circuits configured to connect to power lines 103, 105, and/or 108. FIG. 4 illustrates the connection between the power line communication transmitter and/or receiver circuitry to the power lines according to some embodiments. PLC transmitter/receiver 401 may function as the transmitter and/or receiver circuit. PLC transmitter/receiver 401 generates pre-coded signals for transmission over the power line network. Each output signal, which may be a digital signal, is provided to a separate line driver circuit 402A-C. Line drivers 402A-C comprise, for example, digital-to-analog conversion circuitry, filters, and/or line drivers that couple signals from PLC transmitter/receiver 401 to power lines 403A-C. Transformer 404 and coupling capacitor 405 link each analog circuit/line driver 402 to its respective power line 403A-C. Accordingly, in the embodiment illustrated in FIG. 4, each output signal is independently linked to a separate, dedicated power line.

FIG. 4 further illustrates an alternate receiver embodiment. Signals are received on power lines 403A-C, respectively. In an embodiment, each of these signals may be individually received through coupling capacitors 405, transformers 404, and line drivers 402 to PLC transmitter/receiver 401 for detection and receiver processing of each signal separately. Alternatively, the received signals may be routed to summing filter 406, which combines all of the received signals into one signal that is routed to PLC transmitter/receiver 401 for receiver processing.

FIG. 5 illustrates an alternative embodiment in which PLC transmitter/receiver 501 is coupled to a single line driver 502, which is in turn coupled to power lines 503A-C by a single transformer 504. All of the output signals are sent through line driver 502 and transformer 504. Switch 506 selects which power line 503A-C receives a particular output signal. Switch 506 may be controlled by PLC transmitter/receiver 501. Alternatively, switch 506 may determine which power line 503A-C should receive a particular signal based upon information, such as a header or other data, in the output signal. Switch 506 links line driver 502 and transformer 504 to the selected power line 503A-C and associated coupling capacitor 505. Switch 506 also may control how received signals are routed to PLC transmitter/receiver 501.

FIG. 6 is similar to FIG. 5 in which PLC transmitter/receiver 1901 is coupled to a single line driver 1902. However, in the embodiment of FIG. 6, power lines 603A-C are each coupled to a separate transformer 604 and coupling capacitor 605. Line driver 602 is coupled to the transformers 604 for each power line 603 via switch 606. Switch 606 selects which transformer 604, coupling capacitor 605, and power line 603A-C receives a particular signal. Switch 606 may be controlled by PLC transmitter/receiver 601, or switch 606 may determine which power line 603A-C should receive a particular signal based upon information, such as a header or other data, in each signal. Switch 606 also may control how received signals are routed to PLC transmitter/receiver 601.

In various embodiments, the circuits described above and/or the computer system shown in FIG. 24 implement signal processing operations configured to generate, transmit, and/or receive one or more PLC signals communicated over one or more power lines. Turning to FIG. 7, a diagram of a PLC data frame is depicted according to some embodiments. Particularly, frame 700 includes preamble portion 701, header portion 702, and payload portion 703. Generally speaking, each of portions 701-703 may contain different symbols (e.g., OFDM symbols) and may have distinct formats depending upon the PLC standard being used in a given communication. For example, the G3 and G.9955 standards are largely similar. Nonetheless, there are differences between them in terms of sampling frequency, tone spacing, coherent/differential modulation, etc. In some cases, the various embodiments described below, systems and methods for generating, transmitting, and/or receiving PLC frames may be used with any such PLC standard (e.g., PRIME, G3 CENELEC A, G3 FCC, G.hnem, IEEEP1901.2 devices, SFSK, etc.).

In some embodiments, one or more symbols used in preamble 701 (SYNC symbols) may be generated to enable lower peak-to-average power ratio (PAPR) in time domain, thus allowing a higher boosting of preamble 701 with respect to payload 703. In some cases, the techniques described below may enable preamble boosting of more than 4 dB with respect to the data. Preamble boosting may be helpful because in enabling accurate synchronitation with fewer preamble symbols. It may be made possible by the fact that the OFDM signal typically has a much larger PAPR than a well-chosen preamble sequence, and the power amplifier design is often constrained by the peak value of the signal and not its rms value. Thus, if the preamble sequence has smaller PAR, it may be boosted while maintaining the peak signal level.

A typical preamble sequence pattern in given by Table I:

TABLE I

| Carrier | $\phi_c$ |
|---|---|
| 0 | $2(\pi/8)$ |
| 1 | $1(\pi/8)$ |
| 2 | 0 |
| 3 | $15(\pi/8)$ |
| 4 | $14(\pi/8)$ |
| 5 | $12(\pi/8)$ |
| 6 | $10(\pi/8)$ |
| 7 | $7(\pi/8)$ |
| 8 | $3(\pi/8)$ |
| 9 | $15(\pi/8)$ |
| 10 | $11(\pi/8)$ |
| 11 | $6(\pi/8)$ |
| 12 | $1(\pi/8)$ |
| 13 | $11(\pi/8)$ |
| 14 | $5(\pi/8)$ |
| 15 | $14(\pi/8)$ |
| 16 | $7(\pi/8)$ |
| 17 | $15(\pi/8)$ |
| 18 | $7((\pi/8)$ |
| 19 | $15(\pi/8)$ |
| 20 | $6(\pi/8)$ |
| 21 | $13(\pi/8)$ |
| 22 | $2(\pi/8)$ |
| 23 | $8(\pi/8)$ |
| 24 | $13(\pi/8)$ |
| 25 | $2(\pi/8)$ |
| 26 | $6(\pi/8)$ |
| 27 | $10(\pi/8)$ |
| 28 | $13(\pi/8)$ |
| 29 | 0 |
| 30 | $2(\pi/8)$ |
| 31 | $3(\pi/8)$ |
| 32 | $5(\pi/8)$ |
| 33 | $6(\pi/8)$ |
| 34 | $7(\pi/8)$ |
| 35 | $7(\pi/8)$ |

The PAPR of this preamble sequence in time domain is found to be 5.9 dB. However, the original chirp sequence used to design this preamble sequence has a peak to average of only 3 dB. In other words, there is additional 2.9 dB increase of the PAPR when the chirp signal is used to generate the preamble sequence or symbol. Upon investigation, the inventors hereof have determined that, even though the original chirp sequence covers frequencies 36 to 90 kHz, the actual FFT of the chirp sequence shows that about 4 tones (6.25 kHz) on each side of the 36-90 kHz band has a very small amplitude. To illustrate this, FIG. 9 depicts a graph of a fast Fourier transform (FFT) of a 36-90 kHz chirp signal. (A 31-95 kHz signal is also shown as discussed below.) Therefore, when the preamble sequence is "flattened" in frequency domain to enable good channel estimates, there may be significant contribution to PAPR coming from the edge tones to increase the PAPR. As the inventors hereof have also recognized, the phase quantization operation using a $2*\pi/16$ quantizer increases the PAPR even further.

To address these and other concerns, FIG. 8 depicts a flowchart of a method of creating a PLC preamble symbol or sequence according to some embodiments. At block 801 a chirp sequence may be defined over a wide bandwidth. The bandwidth may be selected, at least in part, by subtracting an excess bandwidth parameter from a low nominal frequency and adding the excess bandwidth parameter to a high nominal frequency. In some cases, the high and low nominal frequencies may be based, at least in part, upon a PLC standard. Additionally or alternatively, the excess bandwidth parameter may be a function of a difference between the high and low nominal frequencies. At block 802, a phase angle of a frequency-domain version of the chirp sequence may be extracted to yield a flattened frequency spectrum. Then, at block 803, a phase quantized sequence may be created based, at least in part, upon the flattened frequency spectrum. In some cases, the quantization factor may be smaller than another quantization factor selected based, at least in part, upon a PLC standard. For example, the quantization factor may be $2*\pi/32$ or less.

In some implementations, reduce a preamble's PAPR, a chirp sequence may be defined over a wider bandwidth. For example, a bandwidth from 31-95 kHz may be used (as opposed to nominal frequencies 36-90 kHz). The FFT of the resulting chirp is shown in FIG. 9. Then, the frequency response in the 36-90 kHz band (i.e., between the nominal frequencies) may be flattened, for example, by taking only the phase angle of the FFT. Lastly, the resultant sequence phase may be phase quantized to $2*pi/32$. The FFT of the resultant sequence is also shown in FIG. 9, and the phases of that sequence are shown in Table II below:

TABLE II

| Carrier | $\phi_c$ |
|---|---|
| 0 | $1(\pi/16)$ |
| 1 | $-(\pi/16)$ |
| 2 | $-4(\pi/16)$ |
| 3 | $-7(\pi/16)$ |
| 4 | $-10(\pi/16)$ |
| 5 | $-15(\pi/16)$ |
| 6 | $10(\pi/16)$ |
| 7 | $3(\pi/16)$ |
| 8 | $-4(\pi/16)$ |
| 9 | $-12(\pi/16)$ |
| 10 | $10(\pi/16)$ |
| 11 | $0(\pi/16)$ |
| 12 | $-10(\pi/16)$ |
| 13 | $10(\pi/16)$ |
| 14 | $-2(\pi/16)$ |
| 15 | $-15(\pi/16)$ |
| 16 | $3(\pi/16)$ |
| 17 | $-11(\pi/16)$ |
| 18 | $5(\pi/16)$ |
| 19 | $-10(\pi/16)$ |
| 20 | $4(\pi/16)$ |
| 21 | $-13(\pi/16)$ |
| 22 | $0(\pi/16)$ |
| 23 | $13(\pi/16)$ |
| 24 | $-7(\pi/16)$ |
| 25 | $3(\pi/16)$ |
| 26 | $14(\pi/16)$ |
| 27 | $-8(\pi/16)$ |
| 28 | $1(\pi/16)$ |
| 29 | $8(\pi/16)$ |

TABLE II-continued

| Carrier | $\phi_c$ |
|---|---|
| 30 | 16(π/16) |
| 31 | −9(π/16) |
| 32 | −3(π/16) |
| 33 | (π/16) |
| 34 | 4(π/16) |
| 35 | 7(π/16) |

FIG. 10 is a graph of a preamble symbol created as described above in the time domain exhibiting a PAPR of 4 dB, according to some embodiments. Specifically, the PAPR ($20*\log_{10}(\max/\text{rms})$) of this sequence is found to be 4 dB, which is 1.9 dB better than the preamble sequence of Table I. FIG. 11 is a graph illustrating the autocorrelation of a preamble symbol with respect to two repetitions of the same sequence, according to some embodiments. The correlation values to be noted are from 256 to 511, and it may be determined that the proposed sequence has a good autocorrelation property.

At least because the proposed preamble sequence has a PAPR of 4 dB, the preamble may be boosted with respect to the data by 4 dB or more, assuming the OFDM data has a PAPR of 9 dB. In terms of meeting the emissions mask for the CENELEC standard, for example, a transmitter implementation may introduce certain in-band filtering to meet the emissions mask if needed.

As described above, designing a preamble sequence may include choosing an excess bandwidth parameter for the chirp sequence to ensure desired band is occupied, such that the excess bandwidth is a function of the nominal bandwidth. Also, the preamble for the case of multiple sets of contiguous subcarriers by scaled addition may be obtained. In that regard, the generic formula for a chirp sequence may be given by:

$$S_{CH}(t) = A \cdot \text{rect}(t/T) \cdot \cos\lfloor 2\pi(f_0 t + \tfrac{1}{2}\mu t^2)\rfloor$$

where T is the sequence duration, $f_0$ is the start frequency, and $\mu=(f_f-f_0)/T$ where $f_f$ is the end frequency. If one desires to define a chirp sequence between subcarriers $k_0$ and $k_f$, the question of selecting the appropriate values of start and end frequency may be addressed as follows. First, it should be noted that the peak-to-average ratio for all choices of start and end frequencies is 3 dB. Relevant properties of a SYNCP sequence include cyclic autocorrelation and the band occupancy—to ensure that the chirp sequence occupies the band from $k_0$ and $k_f$ tones but not significantly more or less. Thus, we may define:

$$S_{CH}(t) = A\text{rect}(t/T) \cdot \text{real}(\exp(j2\pi f_0 t)s_o(t)), \text{ where } s_o(t) = \exp(j\pi\mu t^2)$$

The spectrum of $S_{CH}(t)$ may be seen as a modulated version of the spectrum of $S_0(t)$. Consequently, both the bandwidth occupancy and the autocorrelation (equivalent defined by the magnitude of the FFT) may be determined by $s_0(t)$. In other words, it may be sufficient to make suitable choices for $s_0(t)$ alone. Note that $s_0(t)$ is determined only by the difference of the start and end frequencies, or the nominal bandwidth ($f_f-f_0$). If one defines a chirp sequence for a given nominal bandwidth, the actual bandwidth occupied is often less. FIG. 12 is a graph of the FFT output magnitude of a chirp signal defined with nominal start and end tones of 79 and 178, respectively, according to some embodiments. The chirp nominally is defined with start and end indices of 79 and 178 for a nominal bandwidth of 100 tones. However, the 3 dB crossing occurs at tone indices of 83 and 175, for a nominal bandwidth of only 93 tones. Thus, the nominal bandwidth is wider than the actual 3 dB bandwidth by 7 tones.

FIG. 13 is a graph of a difference between nominal and actual bandwidth for Nfft=256 according to some embodiments. More generally, for Nfft=256 tones, the difference between the actual bandwidth and the nominal bandwidth is plotted below. Accordingly, given a desired and end tone index of $k_0$ and $k_f$, the chirp sequence with nominal start and end tones of $k_0$−ceil(D/2) and $k_f$−floor(D/2), where D is an increasing function of the desired bandwidth ($k_f-k_0$). According to some embodiments, Table III below illustrates one such function.

For example, in the time domain, a preamble generator may generate an N-sample sequence for an arbitrary subcarrier mask. Specifically, the preamble sequence in time domain may be generated based upon a chirp sequence over a contiguous set of carriers. If all unmasked carriers are not contiguous, the set of unmasked subcarriers may be broken into $N_{set}$ sets, each containing a contiguous set of subcarriers. For each of these sets, a chirp sequence is obtained. The preamble sequence may then be taken as the scaled sum of the chirp sequences.

Let the $i^{th}$ such set contain $N_{sc}(i)$ subcarriers indexed from $k_0(i)$ to $k_f(i)$. To define the chirp sequence over this set, the excess bandwidth parameter $\Delta(i)$ may be defined as a function of $k_f(i)-k_0(i)$, as given in Table III.

TABLE III

| $k_f-k_0$ | Δ |
|---|---|
| 0-2 | 3 |
| 3-9 | 4 |
| 10-21 | 5 |
| 22-34 | 6 |
| 35-54 | 7 |
| 55-76 | 8 |
| 55-76 | 8 |
| 77-102 | 9 |
| 103-138 | 10 |
| 139-200 | 11 |

Accordingly, the chirp sequence may be defined as:

$$c^i(t) = \cos\left[2\pi\left(\frac{k_0(i)-\lceil\Delta(i)/2\rceil}{N}t + \frac{1(k_f(i)-k_0(i)+\Delta(i))}{2N^2}t^2\right)\right]$$

$$c^i(t) = \cos\left[2\pi\left(\frac{k_0(i)-\lceil\Delta(i)/2\rceil}{N}t + \frac{1(k_f(i)-k_0(i)+\Delta(i))}{2N^2}t^2\right)\right]$$

for $t = 0, 1, \ldots N-1$.

Using the definition of $\Delta(i)$ and adjusting the start and end frequencies as above may ensure that the actual occupied bandwidth of the chirp sequence extends from $k_0(i)$ to $k_f(i)$. Hence, the time domain sequence is given by:

$$S_1(t) = \frac{N_{sc}(i)}{\sqrt{\sum_{i=1}^{N_{set}} N_{sc}^2(i)}} c^i(t)$$

for $t = 0, 1, \ldots, N-1$.

As another example, in the frequency domain, a frequency domain signal may be generated by taking a DFT of the time domain sequence generated above. The resultant sequence is made zero on all masked subcarriers. The magnitude of the unmasked carriers may be set to be the same, and the phase may be quantized to the nearest multiple of pi/4, for example.

To modulate the preamble symbol, for the non-masked subcarriers of the preamble, a bit sequence of all 1's may be mapped using the 1-bit constellation. A linear feedback shift register (LFSR) generator may be initialized at the beginning of the preamble to a given seed. The output of a mapper shall be subsequently rotated using the two bits that are the least significant bits (LSBs) of the LFSR, s1, and s2, resulting in constellation point $Z_t$. The LFSR may then be advanced by 2 bits for each preamble's subcarrier (either masked or not).

To create an entire preamble (e.g., preamble portion 701 in FIG. 7) based on the generated symbols, the output time-domain symbol $S_1(t)$ may be repeated $N_I$ times. If $N_1$ is a non-integer number, the fraction of the symbol replica may be prepended at the beginning of the section. If $N_2$ is a non-integer number, the fraction of the symbols replica may be appended at the end of the section. A first and a second section of the preamble may be windowed, overlapped and added as described below and shown in FIG. 14.

Specifically, as depicted in FIG. 14, for a first preamble section, a first symbol (e.g., a first OFDM symbol) of the first section may be cyclically extended by pre-pending the last β/2 samples of the symbol $S_1$. The last symbol of the first section may be cyclically extended by appending the first β/2 samples of the symbol $S_1$. The first and last β samples of the extended first section may be windowed with a window function $w_β(n)$ and $w_β(β-n-1)$ respectively. For a second preamble section, the first symbol of the second section may be cyclically extended by pre-pending the last β/2 samples of the symbol $S_2$. In some cases, $S_2$ may be the negative (or a phase inverted version) of $S_1$. The last symbol of the second section may be cyclically extended by appending the first β/2 samples of the symbol $S_2$. The first and last β samples of the extended second section may be windowed with a window function $w_β(n)$ and $w_β(β-n-1)$ respectively.

Still referring to FIG. 14, the β windowed samples at the end of the first section and at the beginning of the second section may be overlapped and added. And the β windowed samples at the end of the second section may be overlapped and added with the b windowed samples. The number $N_{pr}$ of samples in the preamble may then be computed as:

$$N_{pr} = β + N_1 \cdot N + N_2 \cdot N$$

In some embodiments, multiple domains that operate physically close to each other may be differentiated during synchronization. Specifically, different G.hnem networks may operate in close vicinity for example in home area networking and other applications, and may cause interference to each other. This may happen, for example, in home area networking (HAN) scenario when multiple domains either in the same dwelling or in different dwellings interfere with each other. Another scenario may occur when signals from the low voltage (LV) side of the transformer may go through the MV/LV transformer and cross over to another LV domain. Yet another scenario may occur when the different domains for lighting interfere with each other. Therefore, the inventors hereof have discovered ways to differentiate between the different domains by using a synchronization preamble. In some cases, these techniques may allow a unique identification for each of the domain based upon synchronization preamble while ensuring low PAPR in order to permit boosting.

FIG. 15 is a diagram illustrating a PLC preamble portion of a PLC frame according to some embodiments. Current standards suggest that multiple preamble sequences (SYNCP) should be repeated with the last sequence (SYNCM) being phase inverted with respect to the previous ones. In contrast with that approach, some of the embodiments described below may employ a unique domain specific sequence as SYNCM. In the example shown in FIG. 15, a preamble is composed of N1=6 identical S1 symbols and N2=1½ identical S2 symbols. Each of the S1 and S2 symbols may be IFFT_SIZE=256 samples and is pre-stored in the transmitter and transmitted at the beginning of each frame. Again, in certain implementations, S2 is identical to S1 except that all the carriers are π phase shifted (or equivalently inverted time domain waveform of the S1 symbols).

For example, in some embodiments, sequence S2 be different from S1. Further different S2 sequences be allowed based upon the domain identification. The S2 sequences thus defined may have desirable cross-correlation properties. As an example, in some cases S2 sequences may include Zadoff-Chu sequences either in time domain or in frequency domain. Particularly, a Zadoff-Chu sequence of length N for a PLC domain ID "q" may be given by the equation below:

$$s_q^2(m) = e^{-j\frac{\pi qm(m+1)}{N}},$$

$$0 \leq m \leq N - 1$$

Time domain construction preamble sequences using Zadoff-Chu sequences may be performed as follows. From the equation above, let us take N=37 and then take a length 37 FFT. Use this length 37 sequence in the frequency domain from G.hnem tone number 22 to 58 (and also the tones 236 to 200 with complex conjugate) and then take an IFFT of the resulting sequence. The resulting sequence in time domain may be used as the preamble sequence S2. For different values of q, different sequences may be used for different domains.

In the frequency domain, starting from the equation above, again let us take N=37 and use the resulting sequence directly in the frequency domain from tones 22-58 (and also the tones 236 to 200 with complex conjugate) and then take an IFFT of the resulting sequence. The resulting sequence in time domain may be used as the preamble sequence S2. Similarly to the time-domain generation, for different values of q, different sequences may be used for different domains.

The PAPR of frequency domain based construction may be higher than when using time domain based construction; the auto correlation of the two sequences, however, may be similar. As mentioned above, by changing the q different preamble sequences can be obtained that can be used to identify the different domains.

The 36 sequences based on the immediately preceding equation were generated and the PAPR for those sequences is shown in FIG. 16. Specifically, FIG. 16 is a graph of sorted PAPR for time-domain and frequency-domain generated Zadoff-Chu sequences according to some embodiments for N=37 and q=7. It may be noted that the resulting PAPR of the sequences using either time domain or frequency domain construction is similar. FIG. 17 is a graph illustrating the autocorrelation of the frequency-domain based preamble sequences for q=23 using Zadoff-Chu constructions according to some embodiments. The auto-correlation of time domain and frequency domain generated sequences is similar. As mentioned above, by changing the q different preamble sequences can be obtained that can be used to identify the different domains.

Assuming, for sake of illustration, that only 8 sequences are to be defined for the multiple domains, sequences for q=[14 15 16 18 19 21 22 23] may be defined in the frequency domain which give a low PAPR of [5.8, 5.4, 5.8, 5.4, 5.4, 5.8, 5.4, 5.8] dB respectively. In addition a $9^{th}$ sequence can be chosen to be the chirp sequence. Also a $10^{th}$ sequence can be chosen to be a time flipped version of the sequence. The worst case cross-correlation for all combinations for the 8 Zadoff-Chu sequences generated using frequency domain along with two other sequences was found to be 10 dB below the main peak. FIG. 18 is a graph illustrating a comparison between auto-correlation and cross-correlation for Zadoff-Chu sequences with q=36, 37 generated using a time-domain technique according to some embodiments. A cumulative probability distribution for the cross correlation is shown in FIG. 19. It may be noted that the cross-correlations for the chosen sequences lie 10-13 dB below the main peak.

Thus, according to some embodiments, preamble sequences may identify multiple domains based upon Zadoff-Chu sequences and the chirp sequence. In some implementations, for example, $N_1$ and/or $S_2$ sequence may be used, alone or in combination, identify a given PLC domain. The preamble sequence may be obtained by starting with either the length 37 Zadoff-Chu sequence in time or frequency domain. For a length 37 sequence, there are 36 Zadoff-Chu sequences. Thus, 8 sequences with low PAPR may be selected, with the 9th sequence being the chirp sequence and the 10th sequence being its time flipped version.

In some embodiments, the use of repeated SYNC sequences may enable frame boundary detection in the presence of impulsive noise. For example, one or more SYNCN symbols may be inserted in the PHY frame header (i.e., header 702 of FIG. 7) at predetermined locations. The receiver may then employ hypothesis testing; but only to locate the first SYNCN symbol in the header. Moreover, these symbols may also serve as pilots and may therefore be used for sampling frequency offset estimation.

To illustrate the foregoing, a preamble structure and waveform are shown as a portion of a PLC frame in FIG. 20. The waveform include of $N_1$ repetitions of the preamble waveform $S_1$, followed by $N_2$ repetitions of its negative. The preamble is followed by the PHY frame header, which may include typical OFDM symbols (with the IFFT output and cyclic prefix). Each OFDM symbol, in turn, may contain pilot tones to aid channel estimation and sampling clock recovery. In a typical situation, after the initial preamble symbol $S_1$ has been detected, impulsive noise may occur, wiping out part or all of the "$S_2$" symbols. Consequently, the receiver may not know where the preamble ends and the frame control header begins.

In some cases, the receiver may try various hypotheses where the frame control header starts, perform channel estimation, soft output generation, and decoding for each of those hypotheses, and then determine the hypothesis that passes a cyclic redundancy check (CRC). Yet, under this approach, it is not possible to determine the correct frame boundary location before the end of the header. Accounting for the delay in decoding many hypotheses, at least the first few data symbols, requires having multiple FFTs taken, which complicates buffer management. Also, to reduce probability of false alarms and erroneous decisions, the CRC has to be made longer.

To address these concerns, certain embodiments described herein may use preamble symbols interspersed with the frame control header. These interspersed symbols may then be used, for example, to estimate both the frame boundary and the sampling frequency offset. For instance, assume that a preamble sequence includes a sequence of N1 symbols equal to $S_1$. If the total number of header symbols is $N_{header}$, an S2 sequence may be inserted after the first round($N_{header}/3$) symbols, and an S1 sequence may be inserted back-to-back after the second round($N_{header}/3$) symbols. To illustrate these techniques, FIG. 21A shows structures of pilot symbols within a PLC header according to some embodiments.

At the receiver, after acquiring the $S_1$ symbol, every next symbol may be tested to determine whether it is also $S_1$. Once a change is detected (either because of the actual end of the preamble, or because of impulse noise), the receiver may hunt for either the $S_2$ or the $S_1$ symbol. Once either of them is found, the receiver knows the frame start. Note that the $S_2$ and $S_1$ symbols can also be used for sampling frequency offset estimation. Indeed, because they contain more tones than time-interspersed pilots, they offer a better sampling frequency offset estimate.

In some implementations, pilot symbols may be kept every 12 tones in the header. Instead of multiplexing the pilots every $12^{th}$ tone, however, a full symbol may be used as a pilot approximately with the same overhead. Turning to FIG. 21B, a diagram illustrating structures of pilot symbols within a PLC header is depicted according to some embodiments. In this non-limiting case, a total of 3 pilot symbols 2103 may be used the PHY-frame header interspersed among header symbols 2102 and after preamble 2101. Further, as previously noted, the added pilot symbols in the header may be used, for example, for channel estimation and frequency correction for decoding the header symbols using the hypothesis testing, for frame synchronization purposes (e.g., in the presence of impulse noise, etc.), and/or to accommodate a cyclic prefix (CP) for the SYNCM.

In various embodiments, more or less symbols ($S_1$ and/or $S_2$) may be embedded in the header. The number of additional symbols may be determined to ensure a small overhead. Also, if impulse noise erases a sequence of symbols, even if the receiver detects one of the embedded symbols, it may still need to determine which one has been detected. Thus, the inserted symbol may be distinguishable by the receiver. In the above example, distinction was achieved by making the embedded symbols have opposite sign: $S_2 = -S_1$. In other cases, however, the symbols may be different from each other (e.g., $S_2$ may be a Zadoff-Chu sequence). Yet other variations may involve, for example, embedding different uncorrelated symbols (not preferred due to complexity of running another correlation), embedding symbols with different phase variations (need to ensure sufficient "distance" between the chosen phases), and embedding symbols at different time periods relative to one another (position modulation), among others.

In some embodiments, certain techniques described herein may be employed in the detection, by a single PLC device, of frames communicated using two or more different standards. As previously noted, even among similar standards (e.g., G3 and G.9955) there may be differences in terms of sampling frequency, tone spacing, coherent/differential modulation, etc. Accordingly, systems and methods described herein may allow a PLC device or modem to support two or more modes of operation (e.g., both G3 and G.9955) coexisting on the PLC domain or environment in an interoperable manner. In some cases, a PLC device may decode headers for both standards by hypothesis testing and, based on the decoded header, the device may then decode the payload. For example, in some implementations, the preambles may be the same for two or more standards. In other implementations, however, different standards may use different preambles. In the latter case, a receiver may detect packets by using preambles of the different standards simultaneously and, according to detected packets, it may decode corresponding payload. These two different implementations are described below with respect to FIGS. 22 and 23, respectively.

Referring to FIG. 22, a receiver may enter dual-header decode mode at block 2201. Alternatively, the receiver may be preset to work in this mode. Further, this particular mode of operation may assume that different standards use the same preamble. At block 2202, the receiver may receive a packet. At block 2203, the receiver makes an assumption that the incoming packet is G.9955 packet and therefore it starts G.9955 header decoding. If decoding is successful, then the device starts decoding G.9955 payload at block 2204. If decoding is not successful, then the device tries to decode G3 header at block 2205. If decoding is successful, then the device decodes G3 payload at block 2206. Otherwise, the receiver may then start finding incoming preambles at block 2202.

Referring to FIG. 23, a receiver may again enter a multi-preamble decode mode at block 2301 (or it may be preset to operate in this mode). At block 2302, the receiver may receive one or more preambles following a plurality of possible PLC standards. At blocks 2303 and 2305, the device may try to detect packets with two or more potentially different preambles simultaneously. If the detected preamble is G3 preamble at block 2303, then the device tries to decode G3 packets at block 2304. If the detected preamble is G.9955 preamble at 2305, then the PLC device tries to decode G.9955 packets at block 2306. If neither is successful, control may return to block 2302.

Although the examples described in FIG. 22 refers to the specific case where only two standards are used (i.e., dual-mode), in other embodiments these techniques may be extended to environments using more than two standards (i.e., multi-mode). Furthermore, it should be recognized that standards other than G3 and G.9955 may be used.

More generally, systems and methods described herein may enable coexistence mechanisms for any two standards such as, for example, in PRIME, G3 CENELEC A, G3 FCC, G.hnem, IEEEP1901.2 devices, SFSK, etc. First, let the preambles from each standard be $S_{PRIME}(t)$, $S_{G3-CENA}(t)$, $S_{G3-FCC}(t)$, $S_{Ghnem}(t)$, $S_{SFSK}(t)$. In a first implementation, the new preamble at the receiver may be defined as $s(t)=S_{PRIME}(t)+S_{G3-CENA}(t)+S_{G3-FCC}(t)+S_{Ghnem}(t)+S_{SFSK}(t)$ (e.g., parallel or simultaneous detection). Additionally or alternatively, other suitable combination of preambles may be used. In the case where the preamble length from each standard is different, zeros may be padded depending on the longest preamble length. Then the receiver may correlate incoming sequences from each device and if the correlated value crosses a certain threshold, then the receiver may attempt to decode each standard's header. If header decoding passes, then the devices may move on to header decoding. If not, the decoding of that particular packet or frame may stop. In general, the new preamble may be some function of the preambles of the different technology—i.e., $s(t)=F(s_{PRIME}(t), s_{G3-CENA}(t), S_{G3-FCC}(t), S_{Ghnem}(t), S_{SFSK}(t))$, wherein F is a function such that correlation of s(t) against the preamble of that technology results in a peak being suitable for detection.

In another implementation, a preamble may be $s(t)=[s_{PRIME}(t)+S_{G3-CENA}(t)+S_{G3-FCC}(t) \, s_{Ghnem}(t) \, s_{SFSK}(t)]$ (e.g., simultaneous detection). Additionally or alternatively, other suitable combination of preambles that may be received, whereby the incoming signal is independently correlated with the preambles for the different technologies. Again, the decoding procedure may be the same as in the preceding implementation, for example, as shown in FIG. 23. Alternatively, if the correlation threshold is exceeded for a technology that the transceiver cannot decode, the "back-off" may happen after the preamble detection stage. Depending upon the mode of operation the "back-off" time may be technology dependent or it may be a common time for the different technologies. In alternative embodiments, other suitable methods based on a combination of preamble detection techniques may be employed such that exact preamble correlation need not be used.

In another implementation, spacing for each standard may be different. In this case, a common FFT length or common sampling frequency may be determined for each standard. For example, for G3-FCC and G.9955 (G.hnem) standards, carrier spacing is 4.6875 kHz and the other is 3.1250 kHz (or 1.5625 kHz, which is 15.625/n, n=5, 10), common sampling frequency may be 2.4 MHz, the FFT length of G3-FCC may be 512, and the FFT length of G.hnem may be 768. Conversely, to find common FFT length, for example, the common FFT length may be 512, whereas the sampling frequency of G3-FCC may be 2.4 MHz and the sampling frequency of G.hnem may be 1.6 MHz. Other combinations may be developed in a similar manner.

In some cases, preamble correlation may be performed in time domain and/or frequency domain. The immediately preceding implementation may ease the frequency domain processing when the carrier spacing is different. In yet other implementation where carrier spacings are different among different standards, different length FFTs may be taken and correlation may be performed in the frequency domain against the preamble of that technology.

In yet another implementation, P1901.2 different band plans are possible such as FCC-Low (defined to be below 145 kHz), FCC high (e.g., from 145-478 kHz) or multi-tone mask mode where the receiver may communicate in one of the tone-masks. Tone mask 1 divides G3-FCC band into two distinct sub-bands each with 36 carriers (e.g., 145-309 kHz and 314-478 kHz). Tone mask 2 divides the G3-FCC band into four distinct bands (e.g., 145-225 kHz, 229-309 kHz, 314-393 kHz, and 398-478 kHz). Accordingly, detecting a packet on a power line for any one of these modes may involve taking an FFT at 1.2 MHz sampling frequency. A 256-point FFT may be taken and correlation may be done on the different bands against the preambles used for corresponding sub-bands.

For sake of illustration, Table IV below shows various different tone masks that may be considered for preamble definitions:

TABLE IV

| Tone mask | Frequency (kHz) | Sampling rate (kHz), FFT size | (Begin tone index, end tone index) |
|---|---|---|---|
| G3 CEN A | 35.9375-90.625 | 400, 256 | (23, 59) |
| G3 CEN B | 98.4375-121.875 | 400, 256 | (63, 78) |
| G3 low band | 37.5-135.94 | 1200, 256 | (8, 29) |
| G3 FCC | 154.6875-487.5 | 1200, 256 | (33, 104) |
| G3 FCC 36 tone mask 1 | 154.6875, 318.75 | 1200, 256 | (33, 68) |
| G3 FCC 36 tone mask 2 | 323.4375-478.125 | 1200, 256 | (69, 104) |
| G3 FCC 18 tone mask 1 | 154.6875-234.375 | 1200, 256 | (33, 50) |
| G3 FCC 18 tone mask 2 | 239.0625-318.75 | 1200, 256 | (51, 68) |
| G3 FCC 18 tone mask 3 | 323.4375-403.125 | 1200, 256 | (69, 86) |
| G3 FCC 18 tone mask 4 | 407.8125-487.5 | 1200, 256 | (87, 104) |

The preamble for multiple tone mask may be obtained, for example, by starting with a chirp sequence over the G3-symbol period sweeping over the individual tone mask frequency and then the carrier phase $\phi_c$ over the multiple tone mask frequency limited to a multiple of $\pi/8$. To obtain the preamble for a tone mask in Table IV above, a method may be initiated with frequency $F_{start}^{TM}$, tone index $N_{start}^{TM}$ and end frequency $F_{end}^{TM}$, tone index $N_{end}^{TM}$ for sampling frequency $F_s$ ($F_s$ being 400 kHz for CENELEC A and 1.2 MHz for G3-FCC and FCC low band, for example), and the following operations (1-7) may be performed:

1. Let n=0:1:(N−1) (N=256 being the length of the FFT);
2. Let $FC1 = F_{start}^{TM}$ and $FC2 = F_{start}^{TM} + 0.5*(F_{end}^{TM} - F_{start}^{TM})$;
3. Let $$\Delta_f = \frac{FC2 - FC1}{N}$$

be the frequency step for the chirp;
4. Then the chirp may be defined as $$\text{chirp}(n) = \cos\left[\frac{2*\pi*n*(F_{start}^{TM} + n*\Delta_f)}{F_s}\right],$$

n=0, 1, - - - (N−1);
5. Now define the FFT of the chirp to be fft_chirp(c)=FFT (chirp(n)); c=0, 2, - - - (N−1);
6. Let y(c)=0 for c=0, 1, 2, - - - (N−1). For each of the tone index, $c = N_{start}^{TM}$ to $c = N_{end}^{TM}$, let $\phi_c$=angle(fft_chirp (c)) in radians, where in $\phi_c \in [0,2\pi)$. The phase for tone c is given by $\phi_c = (\pi/8)*\text{round}(\phi_c/(\pi/8))$. To perform rounding, if the value to be quantized is exactly midway between two integers, then the larger integer may be chosen. Then, for these, $c \in [N_{start}^{TM}, \ldots, N_{end}^{TM}]$, $y(c) = \exp(j*\phi_c)$, and $y(N-c) = \exp(-j*\phi_c)$; and
7. The preamble sequence may then be given by SYNCP (n)=ifft(y), n=0, 1, 2, . . . (N−1). Using this construction, the SYNCP(n) should be a real valued sequence of length N.

For example, for the G3-FCC band, tone mask 0 we have $F_{start}^{TM}$=154.6875 kHz, $N_{start}^{TM}$=33, $F_{end}^{TM}$=487.5 kHz, and $N_{end}^{TM}$=104. Similarly, for the G3-FCC tone mask 1 case in table 10.1, for the first tone mask $F_{start}^{TM}$=154.6875 kHz, $N_{start}^{TM}$=33, $F_{end}^{TM}$=318.75, and $N_{end}^{TM}$=68. And for tone mask 2, $FT_{start}^{TM}$=323.4375 kHz, $N_{start}^{TM}$=69, $F_{end}^{TM}$=487.5, and $N_{end}^{TM}$=104.

As may be seen from Table IV, there are several overlaps between the different tone masks. Again, one way to implement a coexistence mechanism is to detect different preambles at the receiver and use Carrier Sense Multiple Access (CSMA) backoff. In some cases, different sub-band preambles may be derived from the same sampling rate to enable simpler detection mechanism for different preambles. Also, the cross-correlation of the different sub-band preambles may be small (e.g., better than 10 dB of cross correlation value). FIG. 24 shows correlations of the preambles in G3-low band, G3 CEN A and G3 CEN B bands, and FIG. 25 shows correlations of preambles in G3 FCC band, G3 FCC 36 tone masks.

As noted above, embodiments of systems and methods for building, transmitting, and receiving frame structures may be implemented or executed by one or more computer systems. One such system is illustrated in FIG. 26. In various embodiments, system 2600 may be a server, a mainframe computer system, a workstation, a network computer, a desktop computer, a laptop, mobile device, or the like. In different embodiments, these various systems may be configured to communicate with each other in any suitable way, such as, for example, via a local area network or the like.

As illustrated, computer system 2600 includes one or more processors 2610 coupled to a system memory 2620 via an input/output (I/O) interface 2630. Computer system 160 further includes a network interface 2640 coupled to I/O interface 2630, and one or more input/output devices 2625, such as cursor control device 2660, keyboard 2670, display(s) 2680, and/or mobile device 2690. In various embodiments, computer system 2600 may be a single-processor system including one processor 2610, or a multi-processor system including two or more processors 2610 (e.g., two, four, eight, or another suitable number). Processors 2610 may be any processor capable of executing program instructions. For example, in various embodiments, processors 2610 may be general-purpose or embedded processors implementing any of a variety of instruction set architectures (ISAs), such as the x826, PowerPC®, ARM®, SPARC®, or MIPS® ISAs, or any other suitable ISA. In multi-processor systems, each of processors 2610 may commonly, but not necessarily, implement the same ISA. Also, in some embodiments, at least one processor 2610 may be a graphics processing unit (GPU) or other dedicated graphics-rendering device.

System memory 2620 may be configured to store program instructions and/or data accessible by processor 2610. In various embodiments, system memory 2620 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described in the figures above, may be stored within system memory 2620 as program instructions 2625 and data storage 2635, respectively. In other embodiments, program instructions and/or data may be received, sent or stored upon different types of computer-accessible media or on similar media separate from system memory 2620 or computer system 2600. Generally speaking, a computer-accessible medium may include any tangible storage media or memory media such as magnetic or optical media—e.g., disk or CD/DVD-ROM coupled to computer system 2600 via I/O interface 2630. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 2640.

In one embodiment, I/O interface 2630 may be configured to coordinate I/O traffic between processor 2610, system memory 2620, and any peripheral devices in the device, including network interface 2640 or other peripheral interfaces, such as input/output devices 2650. In some embodiments, I/O interface 2630 may perform any necessary protocol, timing or other data transformations to convert data signals from one component (e.g., system memory 2620) into a format suitable for use by another component (e.g., processor 2610). In some embodiments, I/O interface 2630 may include support for devices attached through various types of peripheral buses, such as a variant of the Peripheral Component Interconnect (PCI) bus standard or the Universal Serial Bus (USB) standard, for example. In some embodiments, the function of I/O interface 2630 may be split into two or more separate components, such as a north bridge and a south bridge, for example. In addition, in some embodiments some or all of the functionality of I/O interface 2630, such as an interface to system memory 2620, may be incorporated directly into processor 2610.

Network interface 2640 may be configured to allow data to be exchanged between computer system 2600 and other devices attached to a network, such as other computer systems, or between nodes of computer system 2600. In various embodiments, network interface 2640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2650 may, in some embodiments, include one or more display terminals, keyboards, keypads, touchpads, scanning devices, voice or optical recognition devices, mobile devices, or any other devices suitable for entering or retrieving data by one or more computer system 2600. Multiple input/output devices 2650 may be present in computer system 2600 or may be distributed on various nodes of computer system 2600. In some embodiments, similar input/output devices may be separate from computer system 2600 and may interact with one or more nodes of computer system 2600 through a wired or wireless connection, such as over network interface 2640.

As shown in FIG. 26, memory 2620 may include program instructions 2625, configured to implement certain embodiments described herein, and data storage 2635, comprising various data accessible by program instructions 26226. In an embodiment, program instructions 2625 may include software elements of embodiments illustrated in the above figures. For example, program instructions 2625 may be implemented in various embodiments using any desired programming language, scripting language, or combination of programming languages and/or scripting languages (e.g., C, C++, C#, Java™, JavaScript™, Perl, etc.). Data storage 2635 may include data that may be used in these embodiments (e.g., recorded communications, profiles for different modes of operations, etc.). In other embodiments, other or different software elements and data may be included.

A person of ordinary skill in the art will appreciate that computer system 2600 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

It will be understood that various operations illustrated in connection with FIGS. 1-26 may be executed simultaneously and/or sequentially. It will be further understood that each operation may be performed in any order and may be performed once or repetitiously. In various embodiments, the blocks shown in FIGS. 8, 22, and/or 23 may represent sets of software routines, logic functions, and/or data structures that are configured to perform specified operations. Although these modules are shown as distinct logical blocks, in other embodiments at least some of the operations performed by these modules may be combined in to fewer blocks. Conversely, any given one of the blocks shown in FIGS. 8, 22, and/or 23 may be implemented such that its operations are divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A computing device comprising:
a processor; and
a memory coupled to the processor, wherein the memory is configured to store program instructions, and wherein the program instructions are executable by the processor to cause the computing device to:
generate a chirp sequence having a bandwidth selected, at least in part, by subtracting an excess bandwidth parameter from a low nominal frequency and adding the excess bandwidth parameter to a high nominal frequency;
extract a phase angle of a frequency-domain version of the chirp sequence to obtain a flattened frequency spectrum;
create a phase quantized sequence based, at least in part, upon the flattened frequency spectrum;
employ the phased quantized sequence as a symbol to generate a power line communication (PLC) preamble portion of a PLC frame;
repeat the symbol $N_1$ times to create a first section of the PLC preamble portion, where $N_1$ is an integer;
repeat a phase inverted version of the symbol $N_2$ times to create a second section of the PLC preamble portion, where $N_2$ is an integer different from $N_1$;
extend the first and second sections of the PLC preamble portion; and
combine the first and second extended sections of the PLC preamble portion.

2. The computing device of claim 1, wherein the high and low nominal frequencies are based, at least in part, upon a PLC standard, and wherein the excess bandwidth parameter is a function of a difference between the high and low nominal frequencies.

3. The computing device of claim 1, wherein to create the phase quantized sequence, the program instructions are executable by the processor to further cause the computing device to use a quantization factor smaller than another quantization factor selected based, at least in part, upon a PLC standard.

4. The computing device of claim 1, wherein to extend the first and second sections of the PLC preamble portion, the program instructions are executable by the processor to further cause the computing device to:
prepend last $\beta$ samples of the symbol to a first symbol of the first section of the PLC preamble portion and append first $\beta$ samples of the symbol to a last symbol of the first section of the PLC preamble portion to create the first extended section of the PLC preamble portion, where $\beta$ is less than a number of samples in the symbol;
window the first and last $\beta$ samples of the first extended section of the PLC preamble portion;
prepend the last $\beta$ samples of the symbol to a first symbol of the second section of the PLC preamble portion and append the first $\beta$ samples of the symbol to a last symbol of the second section of the PLC preamble portion to create second extended section of the PLC preamble portion; and
window the first and last $\beta$ samples of the second extended section of the PLC preamble portion.

5. The computing device of claim 1, wherein $\beta$ is half the number of samples in the symbol, and wherein $N_1$ identifies a given PLC domain.

6. A computing device comprising:
a processor; and
a memory coupled to the processor, wherein the memory is configured to store program instructions, and wherein the program instructions are executable by the processor to cause the computing device to:
generate a chirp sequence having a bandwidth selected, at least in part, by subtracting an excess bandwidth parameter from a low nominal frequency and adding the excess bandwidth parameter to a high nominal frequency;
extract a phase angle of a frequency-domain version of the chirp sequence to obtain a flattened frequency spectrum;
create a phase quantized sequence based, at least in part, upon the flattened frequency spectrum;
employ the phased quantized sequence as a symbol to generate a power line communication (PLC) preamble portion of a PLC frame;
repeat the symbol $N_1$ times to create a first section of the PLC preamble portion, where $N_1$ is an integer;
generate another sequence independent from than the phased quantized sequence of the symbol;
repeat the another sequence $N_2$ times to create a second section of the PLC preamble portion, where $N_2$ is an integer; and
combine the first and second sections of the PLC preamble portion.

7. The computing device of claim 6, wherein the another sequence includes a Zadoff-Chu sequence.

8. The computing device of claim 6, wherein the another sequence identifies a given PLC domain.

9. The computing device of claim 6, wherein $N_1$ and the another sequence in combination identify a given PLC domain.

10. A computing device comprising:
a processor; and
a memory coupled to the processor, wherein the memory is configured to store program instructions, and wherein the program instructions are executable by the processor to cause the computing device to:
generate a chirp sequence having a bandwidth selected, at least in part, by subtracting an excess bandwidth parameter from a low nominal frequency and adding the excess bandwidth parameter to a high nominal frequency;
extract a phase angle of a frequency-domain version of the chirp sequence to obtain a flattened frequency spectrum;
create a phase quantized sequence based, at least in part, upon the flattened frequency spectrum;
employ the phased quantized sequence as a symbol to generate a power line communication (PLC) preamble portion of a PLC frame;
identify the symbol within the PLC preamble portion of the PLC frame;
insert an instance of the symbol at a predetermined location within a PLC header portion of the PLC frame; and
cause the PLC frame to be transmitted over a power line.

11. A computing device comprising:
a processor; and
a memory coupled to the processor, wherein the memory is configured to store program instructions, and wherein the program instructions are executable by the processor to cause the computing device to:
generate a chirp sequence having a bandwidth selected, at least in part, by subtracting an excess bandwidth parameter from a low nominal frequency and adding the excess bandwidth parameter to a high nominal frequency;
extract a phase angle of a frequency-domain version of the chirp sequence to obtain a flattened frequency spectrum;
create a phase quantized sequence based, at least in part, upon the flattened frequency spectrum;
employ the phased quantized sequence as a symbol to generate a power line communication (PLC) preamble portion of a PLC frame;
receive another PLC frame;
in response to a determination that the computing device is operating in a multi-preamble decode mode,
attempt to decode a preamble portion of the another PLC frame using a first decoding technique, the preamble portion following one of a plurality of different PLC standards;
in response to the attempt being successful, decode the another PLC frame using the first decoding technique; and
in response to the attempt being unsuccessful, attempt to decode the preamble portion of the another PLC frame using a second decoding technique, the first and second decoding techniques each based upon a different PLC standard.

* * * * *